United States Patent
Pan

(10) Patent No.: US 10,853,519 B2
(45) Date of Patent: Dec. 1, 2020

(54) SYSTEM ON CHIP AND METHOD FOR IMPLEMENTING SECURE OPERATING SYSTEM SWITCHING

(71) Applicant: HUAWEI TECHNOLOGIES CO., LTD., Guangdong (CN)

(72) Inventor: Shilin Pan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/453,915

(22) Filed: Jun. 26, 2019

(65) Prior Publication Data

US 2019/0318127 A1    Oct. 17, 2019

Related U.S. Application Data

(63) Continuation of application No. PCT/CN2016/113092, filed on Dec. 29, 2016.

(51) Int. Cl.
| G06F 21/62 | (2013.01) |
| G06F 7/58  | (2006.01) |
| G06F 21/71 | (2013.01) |

(52) U.S. Cl.
CPC .......... *G06F 21/6281* (2013.01); *G06F 7/588* (2013.01); *G06F 21/71* (2013.01)

(58) Field of Classification Search
CPC ....... G06F 21/6281; G06F 7/588; G06F 21/71
See application file for complete search history.

(56) References Cited

U.S. PATENT DOCUMENTS

| 8,479,208 B2 | 7/2013 | Tolopka et al. |
| 2008/0162914 A1* | 7/2008 | Adrangi ............ G06F 9/441 713/2 |

(Continued)

FOREIGN PATENT DOCUMENTS

| CN | 101685484 A | 3/2010 |
| CN | 102122250 A | 7/2011 |

(Continued)

OTHER PUBLICATIONS

Rafla et al., Hardware implementation of context switching for hard real-time operating systems, Aug. 2011, IEEE 54th International Midwest Symposium on Circuits and Systems, pp. 1-4 (Year: 2011).*

(Continued)

*Primary Examiner* — Kenneth W Chang
(74) *Attorney, Agent, or Firm* — Fish & Richardson P.C.

(57) ABSTRACT

A system on chip is integrated in a first semiconductor chip, and includes a secure element and at least one central processing unit that is coupled to the secure element. Security isolation exists between the secure element and the at least one central processing unit. The at least one central processing unit is configured to communicate with the secure element. The secure element includes a secure processor and a first memory that is coupled to the secure processor. The secure processor can suspend running first secure operating system software and further start second secure operating system software, to implement switching between multiple pieces of secure operating system software. Running data of running secure operating system software is stored in the first memory, and running data of secure operating system software that is not run is stored in a second memory outside the system on chip.

20 Claims, 10 Drawing Sheets

(56) References Cited

U.S. PATENT DOCUMENTS

| | | | |
|---|---|---|---|
| 2012/0297177 A1* | 11/2012 | Ghosh | G06F 21/53 |
| | | | 713/2 |
| 2014/0122820 A1 | 5/2014 | Park et al. | |
| 2014/0130151 A1 | 5/2014 | Krishnamurthy et al. | |
| 2014/0298026 A1* | 10/2014 | Isozaki | G06F 21/53 |
| | | | 713/171 |
| 2014/0337610 A1 | 11/2014 | Kawano et al. | |
| 2015/0220729 A1* | 8/2015 | Rudolph | G06F 21/57 |
| | | | 726/27 |
| 2017/0103378 A1 | 4/2017 | Pan | |
| 2017/0201877 A1 | 7/2017 | Luo | |
| 2019/0050844 A1 | 2/2019 | Pan | |

FOREIGN PATENT DOCUMENTS

| | | | |
|---|---|---|---|
| CN | 103400081 | A | 11/2013 |
| CN | 103942503 | A | 7/2014 |
| CN | 104077533 | A | 10/2014 |
| CN | 104778794 | A | 7/2015 |
| CN | 105447402 | A | 3/2016 |
| CN | 105630591 | A | 6/2016 |
| CN | 105912272 | A | 8/2016 |
| TW | 201430609 | A | 8/2014 |
| WO | 2004046924 | A1 | 6/2004 |
| WO | 2016169229 | A1 | 10/2016 |

OTHER PUBLICATIONS

Extended European Search Report issued in European Application No. 16925534.6 dated Nov. 26, 2019, 6 pages.
Office Action issued in Taiwan Application No. 10720146960, dated Aug. 1, 2014, 60 pages.
PCT International Search Report and Written Opinion in International Application No. 2016/113092, dated Aug. 29, 2017, 18 pages (With English translation).
Office Action issued in Chinese Application No. 201680091072.9 dated Jun. 17, 2020, 10 pages (with English translation).

* cited by examiner

SYSTEM ON CHIP AND METHOD FOR IMPLEMENTING SECURE OPERATING SYSTEM SWITCHING

CROSS-REFERENCE TO RELATED APPLICATIONS

This application is a continuation of International Application No. PCT/CN2016/113092, filed on Dec. 29, 2016, the disclosure of which is hereby incorporated by reference in its entirety.

TECHNICAL FIELD

The present invention relates to the field of electronic technologies, and in particular, to a system on chip (SoC) and a method for implementing secure operating system switching.

BACKGROUND

Mobile payment is a service manner in which a user is allowed to use a mobile terminal, for example, a mobile phone, a tablet computer, or a wearable device, to pay for purchased goods or services. Currently, there are three manners of implementing mobile payment by using a mobile terminal: a secure digital (SD) card solution, a subscriber identity module (SIM) solution, or an all-terminal solution in which near field communication (NFC) is combined with a secure element (SE). Currently, the all-terminal solution in which near field communication is combined with a secure element becomes a mainstream solution for implementing mobile payment. In addition, these solutions are tending to merge. For example, the secure element may have a SIM function or another function.

As chip technologies develop, a solution in which a secure element is integrated in a system on chip appears in the prior art, to improve security and reduce costs.

As mobile application scenarios develop, the secure element runs increasingly more types of application software, and application scenarios of the secure element are not limited to mobile payment and may further include some SIM card-related software, for example, application software customized by a communications operator. Therefore, a complexity of the system on chip implemented by integrating the secure element becomes increasingly high, and how to implement a highly integrated system on chip that has a complex function and that fully satisfies a security requirement becomes an issue. For example, in the Chinese patent 201510201343.9, a central processing unit may form a trustzone (TZ) outside a general-purpose operating system environment. The TZ is a trusted execution environment (TEE). A user may enter, in the trusted execution environment, some information related to a secure application such as mobile payment. In addition, the trusted execution environment and the general-purpose operating system environment separately implement application operations of different security levels. The trusted execution environment is a trusted execution environment formed by the central processing unit. Therefore, security of the trusted execution environment still needs to be improved. However, a security level of the trusted execution environment is still lower than a security level of the secure element. Therefore, in the Chinese patent application 201610232101.0, a solution in which a secure element runs multiple pieces of secure application software is provided.

However, different secure application software may be based on multiple different secure operating systems. For example, if a secure element needs to support increasingly more pieces of application software, a secure operating system adapted to different types of application software needs to be developed. However, secure operating system software needs to be certified by a security authority, for example, a bank or a government agency, before going to the market. A period of such certification is long and costs are high. In addition, because of a security requirement, it is inappropriate to frequently modify secure operating system software run by the secure element. For example, when a new application requirement emerges, a secure operating system supporting the new requirement may be directly developed without modifying an original secure operating system. In this way, a quantity of secure operating systems increases. Therefore, the secure element may need to support more different secure operating systems. However, in the prior art, a secure element supports only a single piece of secure operating system software and cannot well support coexistence of multiple secure operating systems. In the non-secure general-purpose operating system field, a solution in which multiple operating systems coexist is available, for example, both a conventional mobile phone and a PC (personal computer) can support multiple operating systems. However, security of this conventional solution cannot satisfy a security level requirement of a secure element, and this conventional solution is not applicable to a system on chip including the secure element. Therefore, an urgent issue to be resolved is how to use the secure element in the system on chip to support multiple secure operating systems.

SUMMARY

Embodiments of the present invention provide a system on chip and a method for implementing secure operating system switching, so as to support switching between multiple secure operating systems while ensuring security.

According to a first aspect, an embodiment of the present invention provides a system on chip. The system on chip is integrated in a first semiconductor chip, and includes a secure element and at least one central processing unit that is coupled to the secure element. Security isolation exists between the secure element and the at least one central processing unit. The at least one central processing unit is configured to communicate with the secure element. The secure element includes a secure processor and a first memory that is coupled to the secure processor; the secure processor is configured to run first secure operating system software; and the first memory is configured to store first running data of the first secure operating system software when the secure processor runs the first secure operating system software. The secure processor is further configured to: when determining that the secure processor needs to switch to second secure operating system software, suspend running of the first secure operating system software, perform at least one of encryption or message authentication code (MAC) computation on the first running data to obtain first secure data, store the first secure data in a first dedicated area that is in a second memory outside the system on chip and that is corresponding to the first secure operating system software, and further start the second secure operating system software. The first memory is further configured to store second running data of the second secure operating system software when the secure processor runs the second secure operating system software.

According to the foregoing technical solution, the secure processor is capable of implementing switching of the running secure operating system software. The first memory inside the secure element may provide memory space required to run secure operating system software, and running data of secure operating system software that is not run is temporarily stored in the second memory outside the system on chip, so that the running data can be conveniently reloaded into the secure element subsequently, and a speed of switching between the multiple pieces of secure operating system software is relatively high. In addition, the first memory does not need to be designed to have a very large capacity, so that the secure element is more easily integrated in the system on chip. One or all operations of encryption or MAC computation may be performed on running data that is of any secure operating system software and that is stored in the second memory, for example, the encryption and the MAC computation may be selectively performed, thereby improving security. Sequences of the encryption and the MAC computation are exchangeable. According to the foregoing solution, the system on chip is capable of supporting coexistence of multiple pieces of secure operating system software, achieving low implementation costs and high security.

In a possible implementation solution, communication between the at least one central processing unit and the secure element includes exchange of data or an instruction. The instruction may be an instruction for controlling or operating the secure element by the at least one central processing unit, and includes but is not limited to a start instruction, a shutdown instruction, a restart instruction, a sleep instruction, an instruction for entering or exiting a low-power state, or an instruction for suspending or resuming work. In the foregoing exchange process, a working state of the secure element may be controlled by the at least one central processing unit, without affecting security of data in the secure element. Optionally, the exchange needs to be performed through a trusted execution environment.

Optionally, the first memory is a volatile memory, for example, a random access memory (RAM). The first memory serves as a memory of the secure processor. Therefore, the first running data may be considered as data that is stored in the first memory and that is related to the running first secure operating system software. Optionally, the first running data may include the running first secure operating system software (instruction code) that is loaded into the first memory, and further include temporary data generated during running of the first secure operating system software. The first running data may further selectively include data of at least one piece of secure application software of the first secure operating system software and temporary data generated during running of the at least one piece of secure application software. Optionally, a variety of the generated temporary data is intermediate data, an intermediate operation result, or other information that does not need to be stored for a long time during running of the software. The random access memory may further be an SRAM (static random access memory), a DRAM (dynamic random access memory), or an SDRAM (synchronous dynamic random access memory). Because the random access memory is integrated in the system on chip, the random access memory may use a same manufacturing technology as the at least one central processing unit, and the technology is relatively easy to be implemented.

Optionally, the second memory is a volatile memory, for example, a random access memory. The random access memory is located outside the system on chip, and therefore, may have very large space. The random access memory may selectively store running data of multiple pieces of secure operating system software that are not running, so that the running data can be conveniently and dynamically reloaded into the secure element subsequently at any time by means of switching, reducing a switching time. The random access memory may further be an SRAM, a DRAM, or an SDRAM.

Optionally, a capacity of the second memory is larger than that of the first memory. For example, the capacity of the second memory may be at least 100 times the capacity of the first memory.

In an optional implementation, running of the second secure operating system software has been suspended by secure operating system switching. When starting the second secure operating system software, the secure processor is further configured to obtain second secure data from a second dedicated area that is in the second memory and that is corresponding to the second secure operating system software, perform at least one of decryption or MAC check computation on the second secure data to obtain the second running data, and run the second running data to re-run the second secure operating system software. The first dedicated area and the second dedicated area are different areas in the second memory. Different dedicated areas for different secure operating system software exist in the second memory. Therefore, storage of the different secure operating system software does not affect each other. In addition, encryption or MAC computation may be performed on each piece of secure operating system software before the secure operating system software is stored in a corresponding dedicated area, so that the at least one central processing unit is capable of conveniently reloading any secure operating system software into the secure element, to implement re-running.

Optionally, the second running data is related data that is of the second secure operating system software and that is stored in the first memory when the second secure operating system software was running. The second running data may selectively include the second secure operating system software (instruction code) that was running, and may further include temporary data generated during running of the second secure operating system software. The second running data may further selectively include data of at least one piece of secure application software based on the second secure operating system software and temporary data generated during running of the at least one piece of secure application software. Optionally, a variety of the generated temporary data is intermediate data, an intermediate operation result, or other information that does not need to be stored for a long time during running of the software.

Optionally, the secure element further includes a cipher engine. The secure processor is further configured to drive the cipher engine to perform the encryption on the first running data and to perform the decryption on the second secure data. The cipher engine may implement hardware acceleration, to increase a processing speed.

Further, a key based on a first random number is used to perform the encryption on the first running data, and a key based on a second random number is used to perform the decryption on the second secure data. The first random number is different from the second random number. During switching, keys used to encrypt and decrypt running data of different secure operating system software are different random numbers or keys generated based on different random numbers, so that the different secure operating systems are not capable of obtaining data from each other, thereby improving security. Further, the key based on the first random number and the key based on the second random number are stored in a third memory outside the system on chip. Before reloading secure operating system software into the first memory each time, the secure processor may first obtain a key that is stored in the third memory and that is corresponding to the secure operating system software, so as to implement the decryption.

Optionally, the secure element further includes a MAC computation engine. The secure processor is further configured to drive the MAC computation engine to perform the MAC computation on the first running data and to perform the MAC check computation on the second secure data. The MAC computation engine is capable of implementing hardware acceleration, to increase a processing speed. For example, the MAC computation may include hash computation. Correspondingly, the MAC check computation may include hash check computation, that is, a de-hash check.

Optionally, a first check value generated from the MAC computation and a second check value used for the MAC check computation are stored in the third memory outside the system on chip. Each time the secure processor suspends running of secure operating system software and stores, in a corresponding dedicated area in the second memory, running data related to running of the secure operating system software, a check value generated from MAC computation performed on the secure operating system software is stored in the third memory. Before reloading the running data into the first memory, the secure processor may first obtain the check value stored in the third memory, so as to check the secure operating system software by using the check value, to verify whether the secure operating system software is tampered with or to check integrity of the secure operating system software.

Optionally, the third memory is a non-volatile memory. Different from both the first memory and the second memory that are merely used as temporary storage devices required to run secure operating system software, the third memory may store data for a long time, for example, may still store corresponding secure operating system software, a corresponding key and a corresponding check value, or the like after a device is powered off.

In another possible implementation solution, running of the second secure operating system software has not been suspended by secure operating system switching. In this case, the second secure operating system software may be referred to as newly-started secure operating system software. Before starting the second secure operating system software, the secure processor is further configured to obtain the second secure operating system software from a third memory outside the system on chip. Therefore, different from the foregoing implementation, system data of the second secure operating system software may be obtained from the third memory, that is, obtain from a volatile memory. Optionally, the third memory may include different dedicated storage areas that respectively store different secure operating system software. Each time the secure processor needs to start new secure operating system software, the at least one central processing unit may obtain corresponding system software data from a corresponding storage area in the third memory, and provide the system software data to the secure processor in the secure element. Optionally, the data may be transmitted through a trusted execution environment.

Further, the secure processor is further configured to receive upgrade software from the at least one central processing unit, and use the upgrade software to upgrade any secure operating system software stored in the third memory. Any one or more pieces of secure operating system software in the third memory may be upgraded, to implement a version update.

In another optional implementation, the secure element further includes a fourth memory, configured to store an on-chip instruction. The fourth memory may be a non-volatile memory, for example, a read-only memory. The on-chip instruction is a software instruction program or code stored in the non-volatile memory and has very high security. This part of on-chip instruction has very high security because of existence of the security isolation, and is not capable of being randomly accessed by a device outside the secure element.

Optionally, because of the security isolation, the at least one central processing unit is not capable of directly accessing the first memory, or at least one register or another storage device in the secure element. For example, the at least one central processing unit and the secure element may be coupled by using a dedicated transmission channel. Except the dedicated transmission channel, there may be no other channel to exchange information between the at least one central processing unit and the secure element. For example, the dedicated transmission channel may be a security isolation device. The security isolation device includes at least one of an isolation memory or a bus bridge. The isolation memory or the bus bridge is configured to implement data or instruction exchange between the at least one central processing unit and the secure element.

In an optional implementation, the at least one central processing unit may support running of at least one of general-purpose operating system software or trusted execution environment software. Optionally, the at least one central processing unit may communicate, when driven by the general-purpose operating system software, with the secure element by using a trusted execution environment. Alternatively, the at least one central processing unit may directly communicate with the secure element when driven by the general-purpose operating system software. Optionally, the communication may be performed by using the dedicated transmission channel. Optionally, the trusted execution environment may be formed by the at least one central processing unit by executing the trusted execution environment software. Optionally, the trusted execution environment software may be integrated with the general-purpose operating system software, to form one software data package.

Optionally, the on-chip instruction includes a boot program instruction required in initialization of the secure processor. Before starting the second secure operating system software, the secure processor is further configured to obtain the boot program instruction from the fourth memory, and execute the boot program instruction to implement initialization. Therefore, each time before starting secure operating system software, the secure processor begins with obtaining the boot program instruction from the fourth memory, to ensure startup security. The boot program instruction may be similar to a BIOS (basic input/output system) instruction in a conventional PC (personal computer). Further, each time switching occurs, after the secure processor stores the first secure data in the first dedicated area, the secure processor is further configured to trigger reset of the secure element. By means of the reset, data in the first memory or another register inside the secure element is cleared during the switching, so that different secure operating systems are not capable of obtaining data from each other, thereby improving security.

Optionally, the on-chip instruction may include a first switching program. The secure processor is configured to: execute the first switching program to suspend running of the first secure operating system software, to perform the at least one of encryption or MAC computation on the first running data to obtain the first secure data, and to store the first secure data in the first dedicated area. In this solution, software that triggers the switching, that is, the first switching program, may be a part of the on-chip instruction; therefore, security is high.

Optionally, the secure processor is configured to: execute a second switching program to suspend running of the first secure operating system software, to perform the at least one of encryption or MAC computation on the first running data to obtain the first secure data, and to store the first secure data in the first dedicated area. The second switching program and the first secure operating system software are integrated in one software package. In this solution, software that triggers the switching, that is, the second switching program, may be bound to the first secure operating system software. Therefore, this is convenient to subsequently upgrade or update this part of software. Binding of the second switching program to the first secure operating system software may be that the second switching program and the first secure operating system software may exist as an integrated software package.

Further, the on-chip instruction includes a startup program. The secure processor is configured to execute the startup program to start the second secure operating system software. After resetting the secure element, the secure processor executes the on-chip instruction to implement secure startup and further start the second secure operating system software. Therefore, security is high.

Optionally, when starting the second secure operating system software, the secure processor is configured to execute the startup program to obtain, from the third memory outside the system on chip, an interrupt identifier of the second secure operating system software; and determine, by identifying the interrupt identifier, that running of the second secure operating system software has been or has not been suspended by secure operating system switching. Because of existence of the interrupt identifier, the secure processor may determine to obtain, from the second memory or the third memory, secure operating system software to be run.

Optionally, the on-chip instruction further includes an upgrade instruction. An upgrade process is completed by the secure processor driven by the upgrade instruction.

In a possible implementation, the secure element further includes a key manager. The secure processor is further configured to: drive the key manager to generate, based on a system root key, a first system key used by the first secure operating system software for secure encryption and decryption; and drive the key manager to generate, based on the system root key, a second system key used by the second secure operating system software for secure encryption and decryption. The first system key is different from the second system key. Each system key is used by corresponding secure operating system software for data encryption and decryption during running of the secure operating system software or secure application software based on the secure operating system software, for example, encryption and decryption during running of a mobile payment application. Optionally, before the first secure operating system software is run, the first system key is generated; and before the second secure operating system software is run, the second system key is generated. Generally, the first secure operating system software and the second secure operating system software are not run simultaneously. Therefore, the first secure operating system software and the second secure operating system software are not capable of accessing the system key of each other.

Optionally, the secure element further includes an OTP memory, configured to store the system root key. The key manager is configured to obtain the system root key from the OTP memory. Optionally, the key manager is configured to generate the first system key according to the system root key and information about the first secure operating system software, and generate the second system key according to the system root key and information about the second secure operating system software.

In a possible implementation, the secure processor is further configured to determine, under control of the at least one central processing unit, that the secure processor needs to switch to the second secure operating system software. For example, the secure processor receives the second secure operating system software transmitted by the at least one central processing unit, or obtains the second secure operating system software from the second memory or the third memory according to a storage address sent by the at least one central processing unit.

Optionally, the system on chip further includes an input interface, configured to receive a trigger message. The at least one central processing unit is configured to: when driven by general-purpose operating system software, receive the trigger message from the input interface and generate a trigger instruction, and further transmit the trigger instruction to the secure processor in a trusted execution environment formed by trusted execution environment software. The secure processor is further configured to determine, after being triggered by the trigger instruction, that the secure processor needs to switch to the second secure operating system software. In this solution, a trigger for the switching comes from the at least one central processing unit, or may be considered as coming from the input interface of the system on chip. The input interface may include but is not limited to an interface of a device such as a touch input device or a keyboard input device. Alternatively, the at least one central processing unit may receive, in the trusted execution environment formed by the trusted execution environment software, the trigger message from the input interface, generate the trigger instruction, and transmit the trigger instruction to the secure processor, thereby improving security.

Optionally, any secure operating system software that can be run by the secure processor can be used to support secure application software that implements mobile payment. The secure operating system software may be chip operating system (COS) software, and the secure application software is based on the COS and may implement a mobile payment function.

According to a second aspect, an embodiment of the present invention provides a device for implementing secure operating system switching, including the system on chip, the second memory, and the third memory located outside the system on chip according to the first aspect. The third memory includes a third dedicated area and a fourth dedicated area, the third dedicated area is used to store the first secure operating system software, the fourth dedicated area is used to store the second secure operating system software, and the second memory or the third memory is located on a second semiconductor chip. For example, the device may be a mobile terminal.

According to a third aspect, an embodiment of the present invention provides a method for controlling a secure processor in a secure element to implement secure operating system switching, including: when determining that the secure processor needs to be controlled to switch from running first secure operating system software to running second secure operating system software, suspending running of the first secure operating system software, performing at least one of encryption or MAC computation on first running data of the first secure operating system software to obtain first secure data, storing the first secure data in a first dedicated area that is in a second memory and that is corresponding to the first secure operating system software, and starting the second secure operating system software. A first memory in the secure element stores the first running data when the secure processor runs the first secure operating system software, and stores second running data of the second secure operating system software when the secure processor runs the second secure operating system software. The secure element and at least one central processing unit are located in a system on chip, the system on chip is integrated in a first semiconductor chip, the second memory is located outside the system on chip, security isolation exists between the secure element and the at least one central processing unit, and the at least one central processing unit is configured to communicate with the secure element.

In a possible implementation, running of the second secure operating system software has been suspended by secure operating system switching. The starting the second secure operating system software includes: obtaining second secure data from a second dedicated area that is in the second memory and that is corresponding to the second secure operating system software, performing at least one of decryption or MAC check computation on the second secure data to obtain the second running data, and running the second running data to re-run the second secure operating system software, where the first dedicated area and the second dedicated area are different areas in the second memory.

Optionally, the performing encryption on the first running data includes: driving a cipher engine in the secure element to perform the encryption on the first running data; and the performing decryption on the second secure data includes: driving the cipher engine to perform the decryption on the second secure data.

Optionally, the performing MAC computation on the first running data includes: driving a MAC computation engine in the secure element to perform the MAC computation on the first running data; and the performing MAC check computation on the second secure data includes: driving the MAC computation engine to perform the MAC check computation on the second secure data.

In another possible implementation, running of the second secure operating system software has not been suspended by secure operating system switching. Before the starting the second secure operating system software, the method further includes: obtaining the second secure operating system software from a third memory outside the system on chip.

Optionally, the method further includes: receiving upgrade software from the at least one central processing unit, and using the upgrade software to upgrade any secure operating system software stored in the third memory.

Optionally, before the starting the second secure operating system software, the method further includes: driving the secure processor to perform initialization.

Further, after the storing the first secure data in a first dedicated area, the method further includes: triggering reset of the secure element.

Further, the operation of suspending running of the first secure operating system software, performing at least one of encryption or MAC computation on first running data to obtain first secure data, and storing the first secure data in a first dedicated area that is in a second memory outside the system on chip and that is corresponding to the first secure operating system software is driven by the first switching program in a fourth memory in the secure element or driven by a second switching program. The second switching program and the first secure operating system software are integrated in one software package.

Further, the operation of starting the second secure operating system software is driven by a startup program in the fourth memory.

Further, when the second secure operating system software is started, the method further includes: obtaining, from the third memory outside the system on chip, an interrupt identifier of the second secure operating system software; and determining, by identifying the interrupt identifier, that running of the second secure operating system software has been or has not been suspended by secure operating system switching.

Optionally, the method further includes: determining, under control of the at least one central processing unit, that the secure processor needs to switch to the second secure operating system software. The process may selectively include: receiving a trigger message by using an input interface of the system on chip; in a general-purpose environment of general-purpose operating system software, receiving the trigger message from the input interface and generating a trigger instruction based on the trigger message; receiving the trigger instruction transmitted in a trusted execution environment formed by trusted execution environment software; and determining, after being triggered by the trigger instruction, that the secure processor needs to switch to the second secure operating system software. Alternatively, the process may further include: in the trusted execution environment formed by the trusted execution environment software, receiving the trigger message from the input interface and generating the trigger instruction, thereby improving security.

According to a fourth aspect, an embodiment of the present invention further provides a computer program, where the computer program is configured to control a secure processor in a secure element to perform the method mentioned in the third aspect. Optionally, at least a part of the computer program can be executed by the secure processor.

According to a fifth aspect, an embodiment of the present invention further provides a computer readable storage medium, including the computer program mentioned in the fourth aspect. Optionally, the computer readable storage medium may include at least one of the first memory, the second memory, the third memory, or the fourth memory in the foregoing embodiments.

According to a sixth aspect, an embodiment of the present invention further provides an apparatus for controlling a secure processor in a secure element to implement secure operating system switching, including: a suspension module, configured to: when determining that the secure processor needs to be controlled to switch from running first secure operating system software to running second secure operating system software, suspend running of the first secure operating system software, perform at least one of encryption or MAC computation on first running data of the first secure operating system software to obtain first secure data, and store the first secure data in a first dedicated area that is in a second memory and that is corresponding to the first secure operating system software; and a start module, configured to start the second secure operating system software. A first memory in the secure element stores the first running data when the secure processor runs the first secure operating system software, and stores second running data of the second secure operating system software when the secure processor runs the second secure operating system software. The secure element and at least one central processing unit are located in a system on chip, the system on chip is integrated in a first semiconductor chip, the second memory is located outside the system on chip, security isolation exists between the secure element and the at least one central processing unit, and the at least one central processing unit is configured to communicate with the secure element.

In a possible implementation, running of the second secure operating system software has been suspended by secure operating system switching. The start module is configured to obtain second secure data from a second dedicated area that is in the second memory and that is corresponding to the second secure operating system software, perform at least one of decryption or MAC check computation on the second secure data to obtain the second running data, and run the second running data to re-run the second secure operating system software, where the first dedicated area and the second dedicated area are different areas in the second memory.

Optionally, the suspension module is configured to: drive a cipher engine in the secure element to perform the encryption on the first running data, and drive the cipher engine to perform the decryption on the second secure data.

Optionally, the suspension module is configured to: drive a MAC computation engine in the secure element to perform the MAC computation on the first running data, and drive the MAC computation engine to perform the MAC check computation on the second secure data.

In another possible implementation, running of the second secure operating system software has not been suspended by secure operating system switching. The start module is configured to obtain the second secure operating system software from a third memory outside the system on chip.

Further, the apparatus further includes an upgrade module, configured to receive upgrade software from the at least one central processing unit, and use the upgrade software to upgrade any secure operating system software stored in the third memory.

Optionally, the apparatus further includes an initialization module, configured to: drive the secure processor to perform initialization before the start module starts the second secure operating system software.

Further, after the first secure data is stored in the first dedicated area, the suspension module is further configured to trigger reset of the secure element.

In a possible implementation, a fourth memory in the secure element includes an on-chip instruction, and the suspension module is included in the on-chip instruction.

In another possible implementation, the suspension module is integrated with the first secure operating system software.

In a possible implementation, the start module is included in the on-chip instruction. Optionally, the upgrade module and the initialization module may also be included in the on-chip instruction.

Optionally, the suspension module is further configured to obtain, from the third memory outside the system on chip, an interrupt identifier of the second secure operating system software; and determine, by identifying the interrupt identifier, that running of the second secure operating system software has been or has not been suspended by secure operating system switching. Further, the suspension module is further configured to determine, under control of the at least one central processing unit, that the secure processor needs to switch to the second secure operating system software.

The apparatus may further selectively include the first secure operating system software and the second secure operating system software.

Further, the apparatus may further include general-purpose operating system software and trusted execution environment software. The general-purpose operating system software is configured to drive the at least one central processing unit to receive a trigger message from an input interface of the system on chip and generate a trigger instruction based on the trigger message. The trusted execution environment software is configured to drive the at least one central processing unit to transmit the trigger instruction to the suspension module in a trusted execution environment formed by the trusted execution environment software. The suspension module is further configured to determine, after being triggered by the trigger instruction, that the secure processor needs to switch to the second secure operating system software. Alternatively, the trusted execution environment software may be configured to: in the trusted execution environment formed by the trusted execution environment software, receive the trigger message from the input interface and generate the trigger instruction; and transmit the trigger instruction to the suspension module, thereby improving security.

According to the foregoing technical solutions, switching between multiple secure operating systems can be flexibly supported. A person skilled in the art can further understand beneficial effects of the related technical solutions by referring to subsequent specific embodiments.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following describes the technical solutions in the embodiments of the present invention with reference to the accompanying drawings in the embodiments of the present invention.

A related mobile terminal in the embodiments of the present invention may be referred to as user equipment (UE), a wireless terminal, or a user terminal, and may use a wireless access service of a service station or a wireless access point. The service station or the wireless access point is generally a base station, for example, an eNodeB in LTE (Long Term Evolution) or a NodeB, or may be an access point, such as a base station controller in a GSM mode, that is used to connect user equipment to a mobile communications network. When the service station provides an access service to a mobile terminal, one or more cells may be formed, and a cell may have a coverage area geographically and occupy a carrier or a frequency band in a frequency domain.

Figure 1:
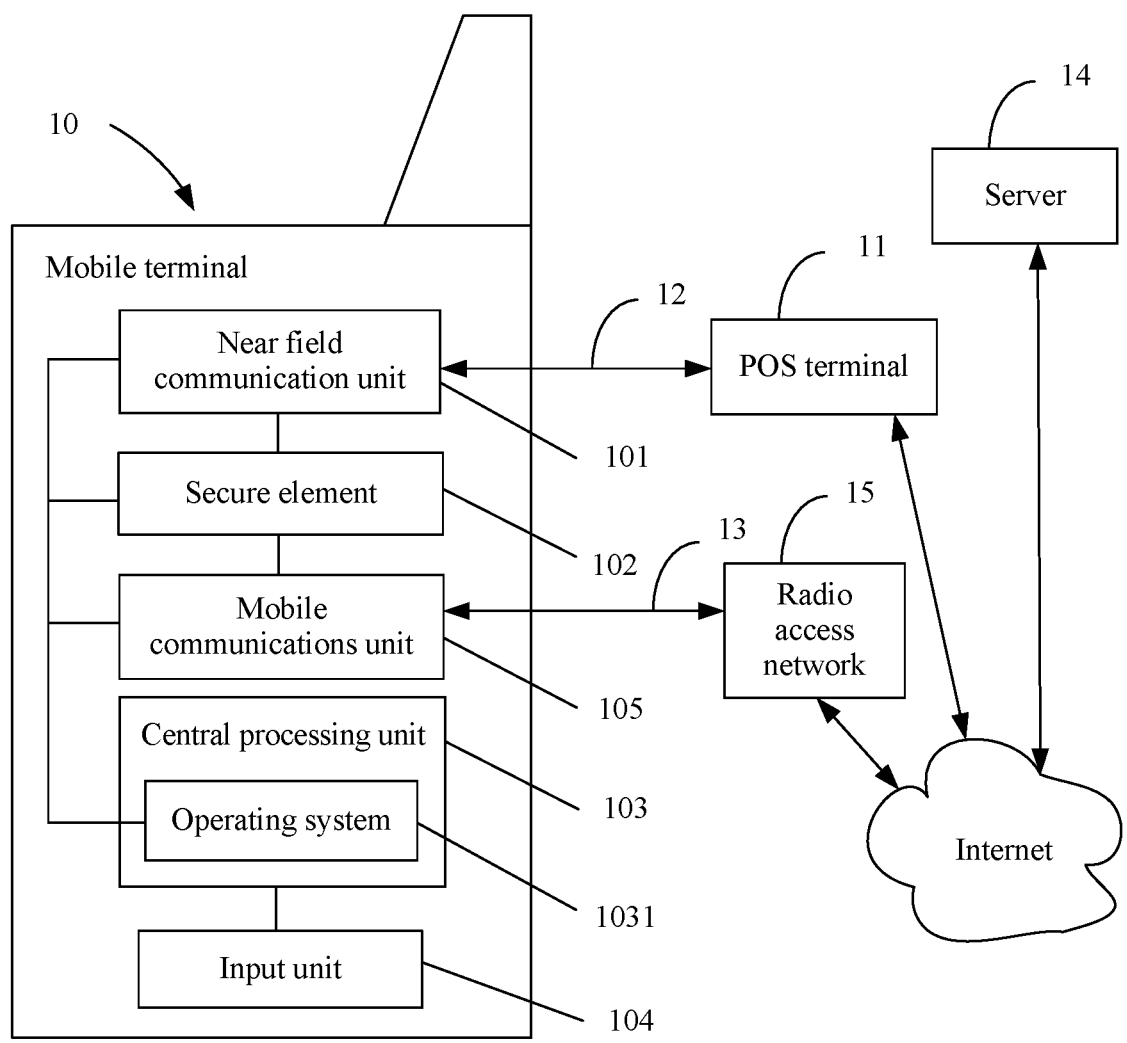
FIG. 1 is a simplified schematic diagram of a mobile terminal used in a mobile payment scenario according to an embodiment of the present invention.

A simplified schematic diagram of a mobile terminal used in a mobile payment scenario is shown in FIG. 1. A mobile terminal 10 communicates with a point of sale (POS) terminal 11 by using a near field communication unit 101 inside the mobile terminal 10. A near field communication link 12 between the near field communication unit 101 and the POS terminal 11 is a bidirectional channel, and short-range wireless communication may be implemented by using various applicable short-range wireless communications protocols, to implement a basic wireless communication function in mobile payment. For example, the communication link 12 may be used to transmit POS instruction data or the like from the POS terminal 11 to the near field communication unit 101 inside the mobile terminal 10. A secure element 102 may be a component coupled to an independent central processing unit (CPU) 103 and configured to run various functions related to a financial payment service, and store data such as a key or a certificate that is related to a banking service. During a transaction, the secure element 102 receives POS instruction data from the near field communication unit 101, parses the POS instruction data, and makes a corresponding response according to a financial transaction agreement. The response is fed back by the near field communication unit 101 to the POS terminal 11, to complete data transmission in the mobile payment, so as to implement a function of the mobile terminal 10 serving as a transaction verification card. The central processing unit 103 runs general-purpose operating system software 1031, for example, Android system software or Windows software. The central processing unit 103 is configured to control the near field communication unit 101 and the secure element 102, for example, control enabling or disabling of the near field communication unit 101 and the secure element 102. In addition, the mobile terminal 10 may include an input unit 104. The input unit 104 may be a touchscreen, and may be considered as a user interface (UI) used to exchange a message with a user. Therefore, the user may enter an operation instruction by using the input unit 104 that is driven by UI software, so as to instruct the general-purpose operating system software 1031 and related application software to perform a related operation. The related operation may include transaction confirmation, input of a personal transaction password, or the like. The POS terminal 11, served as a transaction terminal device, accesses a cloud server 14 on a network side by using the Internet, so that a payment service is computed and completed by using the server 14. The server 14 located on the network side is generally operated by a bank, an Internet company, or the like.

The foregoing solution may include two implementation solutions: online payment and offline payment. As shown in FIG. 1, during the offline payment, non-contact card swiping, that is, swiping of a mobile phone, is performed between the mobile terminal 10 and the POS terminal 11. The near field communication unit 101 and the secure element 102 cooperate to complete a payment transaction. The online payment may be implemented without the near field communication unit 101. In this case, the central processing unit 103 and the secure element 102 may access the Internet by using a mobile communications network to implement the online payment, and the secure element 102 functions as a USB key of a bank and is configured to store and verify a certificate of the bank. Therefore, the near field communication unit 101 in FIG. 1 is optional. Specifically, referring to FIG. 1, during the online payment, the mobile terminal 10 may further include a mobile communications unit 105, configured to replace a function of the near field communication unit 101 during the offline payment. The mobile communications unit 105 accesses a radio access network (RAN) 15. The radio access network 15 may specifically include a wireless access point, for example, the foregoing base station. The mobile communications unit 105 accesses the Internet by using the radio access network 15. The server 14 located on the Internet is connected to the Internet, so that the server 14 is used to receive instruction data or transmit information to the secure element 102. The secure element 102 parses the instruction data and makes a corresponding response according to a financial transaction agreement, so that the mobile communications unit 105 transmits data to the server 14 on the network side by using the mobile Internet. In this case, the mobile communications unit 105 may be a unit running a cellular radio communication protocol, and is configured to connect the mobile terminal 10 to the Internet by using a cellular radio communication link 13. The mobile communications unit 105 is a cellular communication processor and may specifically support a cellular radio communications protocol such as a global system for mobile communications (GSM), a universal mobile telecommunications system (UMTS), worldwide interoperability for microwave access (WiMAX), time division-synchronous code division multiple access (TDS-CDMA), code division multiple access 2000 (CDMA2000), long term evolution (LTE), or 5G (fifth-generation), to help implement a mobile Internet function of the mobile terminal 10.

Figure 2:
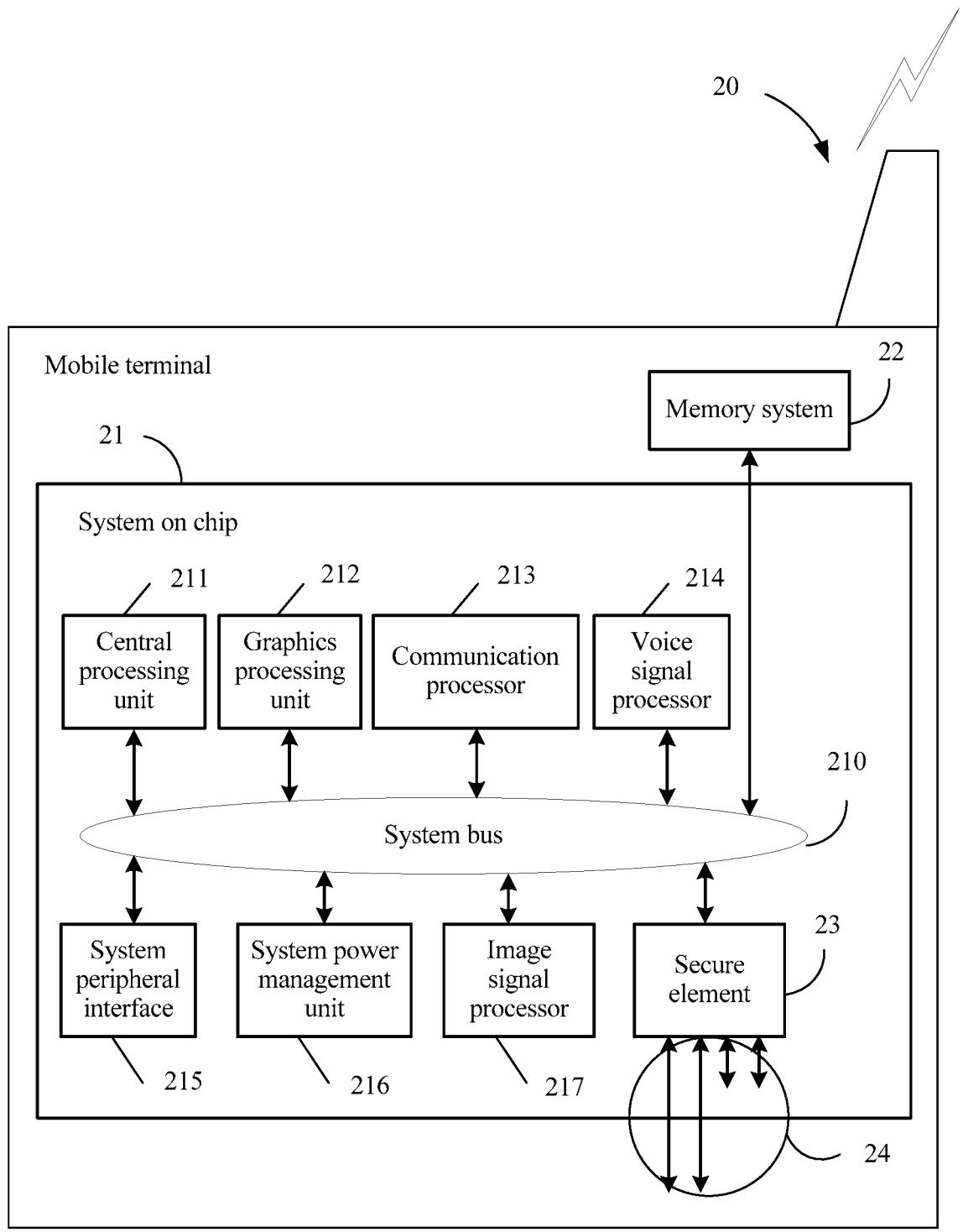
FIG. 2 is a schematic structural diagram of a mobile terminal according to an embodiment of the present invention.

FIG. 2 is a schematic structural diagram of a mobile terminal 20 according to an embodiment of the present invention. The mobile terminal 20 may be various portable terminal devices such as a mobile phone, a tablet computer, or a wearable device. The mobile terminal 20 may specifically include a system on chip 21 and a memory system 22.

The system on chip 21 and the memory system 22 may be coupled to each other by using an interface.

The related system on chip in this embodiment of the present invention is a system manufactured on a same semiconductor chip or semiconductor substrate by using an integrated circuit technology. The semiconductor chip is also referred to as a chip for short and may be a set of integrated circuits manufactured on an integrated circuit substrate (which is usually a semiconductor material such as silicon) by using the integrated circuit technology. An outer layer of the semiconductor chip is usually packaged by using a semiconductor packaging material. The integrated circuit may include various functional devices. Each type of functional device includes a logical gate circuit, or a transistor such as a metal-oxide semiconductor (MOS) transistor, a bipolar junction transistor, or a diode, or may include another component such as a capacitor, a resistor, or an inductor. Each functional device may work independently or work when driven by necessary software, and may implement various functions such as communication, computation, or storage. Therefore, each functional device or module of an apparatus mentioned in this embodiment of the present invention may be hardware, and each functional device may include multiple logical gate circuits or transistors.

In this embodiment, the memory system 22 and the system on chip 21 are separately located on different semiconductor chips. For example, the system on chip 21 is located on a first semiconductor chip, and the memory system 22 is located on another semiconductor chip such as at least one of a second semiconductor chip or a third semiconductor chip. Optionally, the memory system 22 may include a non-volatile memory, and may be specifically an EMMC (embedded multimedia card) or a UFS (universal flash storage). The memory system 22 may further include a volatile memory, for example, a random access memory. It may be understood that generally the non-volatile memory and the volatile memory may be located on different semiconductor chips, and may be implemented by using different integrated circuit manufacturing technologies.

In FIG. 2, the system on chip 21 may include various functional devices, for example, a system bus 210, at least one processor coupled to the system bus 210, and a secure element 23 coupled to the system bus 210. Security isolation exists between the secure element 23 and another component inside the system on chip 21, that is, the at least one processor. For a function of the secure element in a mobile payment scenario, refer to descriptions of the secure element 102 in FIG. 1. More details are described subsequently. The at least one processor may selectively include at least one central processing unit 211, a graphics processing unit (GPU) 212, a communication processor 213, a voice signal processor 214, a system peripheral interface 215, a system power management unit 216, and an image signal processor (ISP) 217. The secure element may selectively include one or more interfaces 24. The interface 24 may include an interface coupled to another component outside the system on chip 21 or an interface coupled to another component inside the system on chip 21.

Apparently, many advantages can be achieved by integrating, in the system on chip, the secure element 23 and another component including the central processing unit 211. For example, costs are greatly reduced, and space for arranging the system on chip on a PCB (printed circuit board) is reduced. Therefore, the secure element 23 and another component can be manufactured based on an equally advanced integrated circuit technology, and this type of technology advancement means security improvement.

In the embodiments of the present invention, the security isolation can be used to restrict the at least one processor from accessing a device or a module inside the secure element 23. Because of the security isolation, the at least one processor, including the central processing unit 211, is not capable of directly accessing at least one memory or register, or another storage device in the secure element 23, and therefore is not capable of randomly reading data or information in the secure element 23.

In FIG. 2, the at least one central processing unit 211 is configured to run general-purpose operating system software; and communicate, when driven by the general-purpose operating system software, with the secure element 23 by using the system bus 210. For a function of the at least one central processing unit 211 in a mobile payment scenario, refer to the central processing unit 103 in FIG. 1. The at least one central processing unit 211 may be implemented based on an advanced reduced instruction set computing machine (Advanced RISC Machine, ARM) architecture, an Intel X86 architecture, or a million instructions per second (MIPS) architecture. This embodiment sets no limitation thereto. Generally, a larger quantity of central processing units 211 indicates a higher data processing capability. The general-purpose operating system software is a general-purpose software platform that runs a variety of common application software. The general-purpose operating system software is the general-purpose operating system 1031 in FIG. 1, and may be an Android operating system, a Windows operating system, or an iOS operating system. The common application software may include instant messaging software, a game, office software, ebook software, an audio and video streaming media player, or the like.

In FIG. 2, the graphics processing unit 212 is configured to process an image signal, for example, process a video image signal or a photo image signal, or selectively process a 3D (three-dimensional) image signal. The system power management unit 216 is configured to control system power of the system on chip 21, for example, manage and control clock and working voltages of the system on chip 21 or at least one component in the system on chip 21, for example, perform AVS (adaptive voltage scaling, Adaptive Voltage Scaling) or DVS (dynamic voltage scaling) or adjust a clock frequency. There may be multiple system peripheral interfaces 215, separately coupled to multiple peripheral devices outside the system on chip 21 in the mobile terminal 20. For example, the peripheral device may be at least one of a USB (Universal Serial Bus) device, a display, a sensor, a camera, a headset, a speaker, or the like. The sensor may be a gravity accelerometer, a gyroscope, an optical sensor, or the like. The image signal processor 217 may be configured to process an image signal collected by a camera of the mobile terminal 20, to obtain a processed collected image. The image may be further processed by the graphics processing unit 212.

The communication processor 213 in FIG. 2 may include multiple processors that perform different communication functions. For example, the communication processor 213 may selectively include a cellular communication processor or a short-range communication processor. The cellular communication processor may support at least one cellular radio communications protocol of GSM, UMTS, WiMAX, TDS-CDMA, CDMA2000, LTE, or 5G For a specific function of the cellular communication processor in mobile payment, refer to the mobile communications unit 105 in FIG. 1. The short-range communication processor may support at least one type of infrared, wireless fidelity (WIFI), Bluetooth, LTE D2D (device-to-device), or NFC. When the short-range communication processor implements an NFC function, for a specific function of the short-range communication processor in the mobile payment, refer to the near field communication unit 101 in FIG. 1. Optionally, each type of communication processor may include a radio frequency (RF) processor configured to process an RF signal and a baseband communication processor configured to execute baseband communication processing or a communications protocol algorithm. Alternatively, each type of communication processor may include only a baseband communication processor, and correspondingly, an RF processor may be disposed outside the system on chip 21. That is, if the system on chip 21 is integrated in the first semiconductor chip, various types of RF processors that send and receive a radio signal by using an air interface may be integrated in another chip different from the first semiconductor chip.

In FIG. 2, the voice signal processor 214 is configured to process a voice signal. The voice signal processor 214 may include at least one of a HiFi (high-fidelity) processor or a voice codec. The HiFi processor may be configured to implement processing such as echo cancellation, smoothing, and timbre enhancement on the voice signal. The voice codec may be configured to implement a voice coding/decoding operation, to implement conversion between the voice signal in a digital form and a natural analog voice signal. Generally, the voice signal processor 214 may include only the HiFi processor. The voice codec includes an analog circuit and may be implemented on another semiconductor chip disposed outside the system on chip 21. This embodiment sets no limitation thereto.

Figure 3:
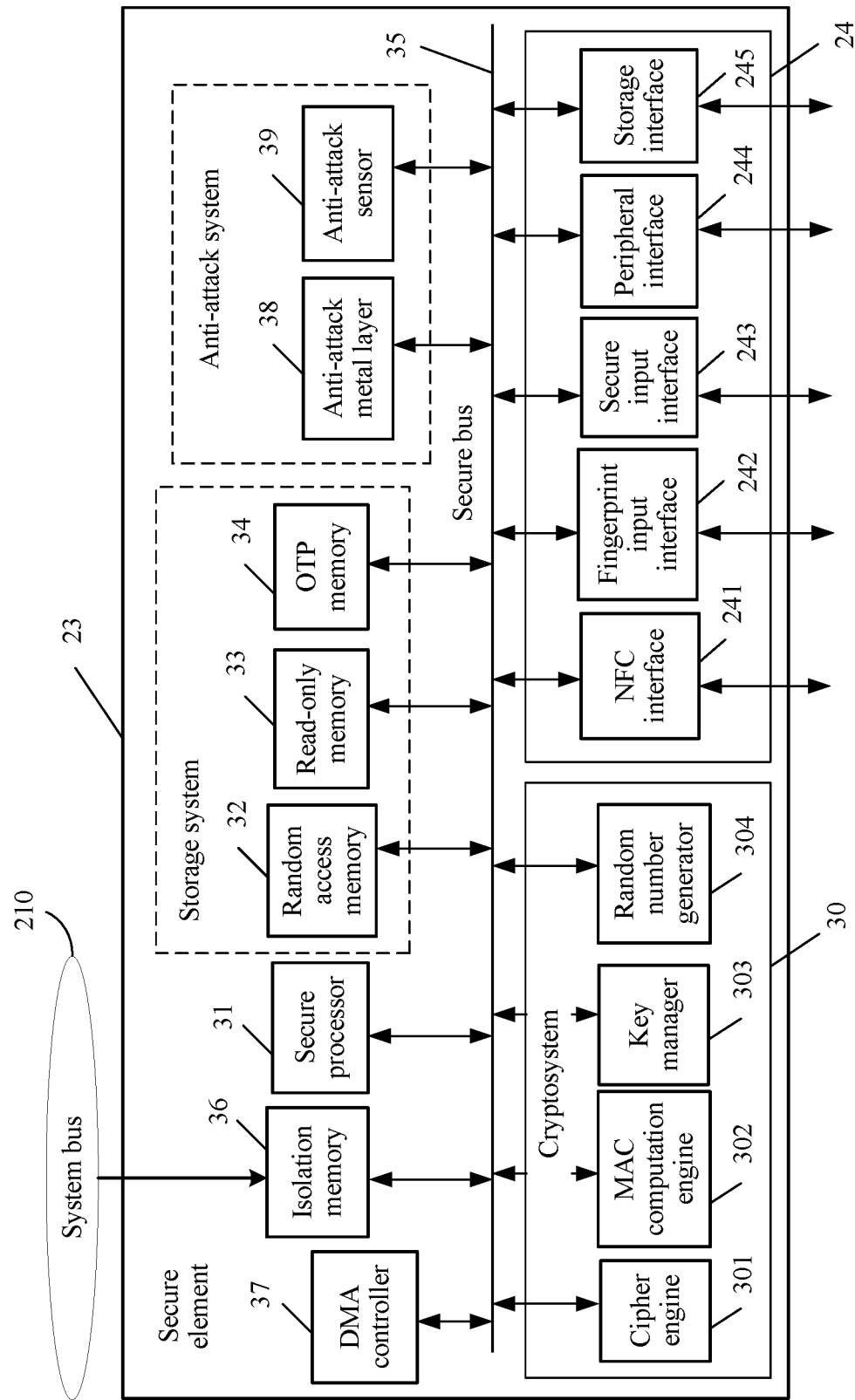
FIG. 3 is a simplified schematic diagram of a secure element in a mobile terminal according to an embodiment of the present invention.

In FIG. 3, a secure element 23 provided in an embodiment of the present invention is described. The secure element 23 not only may be configured to implement a function of a conventional secure element or a SIM function, but also may support multiple pieces of secure operating system software in this embodiment, so as to support more secure application functions to satisfy different secure application requirements. The secure element 23 includes a secure bus 35, and a secure processor 31, a random access memory 32, a read-only memory 33, an OTP memory 34, and multiple interfaces 24 that are coupled to the secure bus 35. The random access memory 32 is a volatile memory, and the read-only memory 33 is a non-volatile memory. In FIG. 3, the random access memory 32, the read-only memory 33, and the OTP memory 34 may be included in one storage system. Alternatively, the memories may not be included in one system, but are independent from each other and are not closely related in a circuit structure. A specific implementation is not limited in this embodiment. The random access memory 32 may be referred to as a first memory. The read-only memory 33 may be referred to as a fourth memory and may be replaced with a non-volatile memory of another type. In this embodiment, the read-only memory is merely used as an example for description.

The secure processor 31 is configured to run secure operating system software and at least one piece of secure application software that is based on the secure operating system software. The at least one piece of secure application software includes mobile payment software. Optionally, the at least one piece of secure application software may further include SIM card application software. The SIM card application software includes but is not limited to virtual SIM software or SIM feature application software customized by a communications operator. The secure processor 31 not only implements the function of the conventional secure element, but also may integrate another function, to extend a secure application scenario of a system on chip 21. Therefore, the secure application software may further perform another extended function, for example, may be extended to a function such as a transportation card, a social security card, or even an identity card. This embodiment sets no limitation thereto.

The random access memory 32 is configured to provide memory space required by the secure processor 31 to run the secure operating system software and the at least one piece of secure application software. This is equivalent to a function of a memory in a PC. The random access memory 32 may be configured to store the secure operating system software and the at least one piece of secure application software that are loaded into the random access memory 32, and may be further configured to store temporary data generated during running of the secure operating system software and the at least one piece of secure application software. After being powered on, the secure processor 31 may load data (for example, instruction code) of the secure operating system software and the at least one piece of secure application software into the random access memory 32, and run corresponding software by using internal storage space of the random access memory 32. The temporary data generated during running is intermediate data, an intermediate operation result, or other information, for example, a variety of intermediate operation result data or configuration data in computation processing, that does not need to be stored for a long time and that is generated when the secure processor 31 runs the secure operating system software and the at least one piece of secure application software. In this case, it is equivalent that the random access memory 32 implements a function of a memory in a computer. The random access memory 32 is a volatile storage device, and may be any one of an SRAM, a DRAM, an SDRAM, or a DDR SDRAM (double data rate synchronous dynamic random access memory).

Because the random access memory 32 is integrated in the system on chip 21, the random access memory 32 may be manufactured by using a same technology as another component inside the system on chip 21, and the technology is relatively easy to be implemented. The secure processor 31 may be configured to boot initialization of another component inside the secure element 23 in a power-on start process, and load the data of the secure operating system software and the at least one piece of secure application software into the random access memory 32 to execute a computation operation. The secure processor 31 may be a processor whose operation speed or implementation complexity is lower than that of at least one central processing unit 211. However, the secure processor 31 usually has lower power consumption and higher security, and may be, for example, a processor with an ARM architecture, another dedicated anti-attack processor, or a digital signal processor (DSP).

For example, the secure operating system software run by the secure processor 31 may be COS software. The COS software is also referred to as a COS mirror, and may include a function of operating system software in a resident smart card or in a financial integrated circuit (IC) card. In this case, the secure element 23 includes the function of the conventional secure element, the function of the resident smart card, or the function of the financial card, and is configured to provide an external POS terminal, an external card reader, or an external financial server on a cloud side with data required in a mobile payment service such as card swiping, for example, data related to a bank financial service or personal account data of a user, such as a personal account, a password, or a variety of verification information required by a bank server to verify a personal account. In addition, the COS mirror may also be an operation platform for receiving and processing external payment information (for example, a variety of payment information sent by the financial server, the card reader, or the POS terminal), and may be selectively used to execute a variety of instruction information sent from the outside, for example, an operation such as an authentication computation. A COS may be designed based on a JAVA computer programming language, and can be preconfigured in the secure element 23. In addition, based on the COS, a mobile terminal 20 may further dynamically download and install a variety of secure application software, for example, a variety of financial application software. A specific design of the COS belongs to content in the prior art and is beyond a discussion scope of this application.

In FIG. 3, communication between the at least one central processing unit 211 and the secure element 23 includes exchange of data or an instruction. The instruction may be an instruction for controlling or operating the secure element 23 by the at least one central processing unit 211, and includes but is not limited to a start instruction, a shutdown instruction, a restart instruction, a sleep instruction, an instruction for entering or exiting a low-power state, or an instruction for suspending or resuming work, to instruct the secure element 23 to enter a state corresponding to each instruction. For example, when the central processing unit 211 sends a sleep instruction to the secure element 23, the secure element 23 may respond to the instruction and enter a sleep state. In the foregoing exchange process, a working state of the secure element 23 may be controlled by the at least one central processing unit 211 without affecting security of data in the secure element 23. In addition, optionally, the instruction may be further used to implement another control process, for example, control a working state. This may specifically include control of a working voltage, a working clock frequency, an information processing rate, or the like of the secure element 23 or at least some components of the secure element 23. This embodiment sets no limitation thereto. The foregoing exchange process may be performed in a trusted execution environment.

The multiple interfaces 24 in FIG. 3 may flexibly adapt to different use scenarios, and may selectively include one or more of a near field communications interface 241, a fingerprint input interface 242, a secure input interface 243, a peripheral interface 244, or a storage interface 245. The near field communications interface 241 is coupled to a near field communication processor in the mobile terminal 20, so that the system on chip 21 may exchange, with a near field communication peer end such as the POS terminal by using the near field communication processor, near field communication information related to mobile payment. The near field communication information includes at least one of a mobile payment instruction, mobile payment data, or near field communication authentication information. The fingerprint input interface 242 is coupled to a fingerprint sensor in the mobile terminal 20 and is configured to receive fingerprint data from the fingerprint sensor. The fingerprint data is used for fingerprint recognition-based user authentication in the mobile payment. The secure input interface 243 is configured to receive user information that is entered by a user and that is related to the mobile payment. Optionally, the user information includes a password, a user instruction, or a financial transaction amount that is entered by the user. The user instruction may be an instruction for confirming, stopping, or continuing the mobile payment. Therefore, the secure input interface 243 may be coupled to an input device in the mobile terminal 20, so as to receive the user information by using the input device. The peripheral interface 244 is configured to indicate, by using a peripheral device in the mobile terminal 20, the user that the mobile payment is performed. For example, the peripheral device may be an indication device such as an indicator, or a speaker or a vibrator used to play a sound, and may be configured to notify, by using a light signal, a sound, or a vibration, the user that the mobile payment is being, has been, or is about to be performed. The storage interface 245 may be coupled to a memory outside the system on chip 21, for example, the memory system 22 in FIG. 2. Optionally, the multiple interfaces 24 may further include an interface of another type, such as an interface used for iris recognition and facial recognition. This embodiment sets no limitation thereto.

Further, referring to FIG. 3, in the system on chip 21, because of security isolation, a system bus 210 and the secure bus 35 are coupled by using an isolation memory 36. The isolation memory 36 may be located inside or outside the secure element 23. In this embodiment, that the isolation memory 36 is located inside the secure element 23 is used as an example for description. Because of the security isolation, at least one processor located outside the secure element 23 exchanges data or an instruction with the secure element 23 by using the isolation memory 36. In an instance, the at least one processor, including the central processing unit 211, is not capable of directly accessing any component other than the isolation memory 36 in the secure element 23. For example, the at least one central processing unit 211 may be coupled to the secure element 23 by using the system bus 210 and the isolation memory 36, to communicate with the secure element 23. Content of the communication includes data or an instruction, for example, data is transferred to at least one element inside the secure element 23. In this case, the isolation memory 36 is a dedicated exchange channel or even a sole channel used by the secure element 23 to interact with the external, that is, a mailbox channel used to implement data or information exchange, so as to prevent the at least one external processor from directly accessing the random access memory 32 or any register or another data storage component in the secure element 23, thereby improving security.

The isolation memory 36 is preferably a volatile memory, for example, a random access memory. However, the isolation memory 36 may be replaced with a non-volatile memory. When one or more non-secure processors in the system on chip 21, for example, the central processing unit 211, need to write data into the secure element 23, the one or more non-secure processors first write the data into the isolation memory 36, and then notify the secure processor 31 in the secure element 23 by using an interrupt or other indication information; and the secure processor 31 reads and migrates the data from the isolation memory 36. On the contrary, the secure processor 31 writes data or information into the isolation memory 36 and instructs, by using an interrupt or other indication information, another processor outside the secure element 23 to read the data from the isolation memory 36. Data exchange between the central processing unit 211 and the secure element 23 may be implemented in the trusted execution environment.

Alternatively, the related isolation memory 36 in FIG. 3 in this embodiment may be replaced with a security isolation device of another type, for example, a bus bridge. The bus bridge is a bus bridged between the secure bus 35 of the secure element 23 and the system bus 210. The bus bridge is dedicatedly configured to transmit data or information between two buses of different security, to replace a function of the isolation memory 36 and to couple the system bus 210 to the secure bus 35. Optionally, further security processing may be performed on the data transmitted on the bus bridge, to improve security. For example, special encryption and decryption processing needs to be performed on the data transmitted on the bus bridge. This embodiment sets no limitation thereto. Either the bus bridge or the isolation memory 36 is a dedicated transmission channel and is configured to implement coupling between the secure element 23 and an external system. The channel may be a sole transmission channel between the secure element 23 and the at least one central processing unit 211, thereby implementing system isolation and improving security.

The security isolation is implemented by using a security isolation device such as the isolation memory 36 or the bus bridge, and the at least one processor outside the secure element 23 is not capable of randomly accessing a memory or a register inside the secure element 23. By using the security isolation device, the secure element 23 may selectively transmit, to a processor coupled to the system bus 210, data that the processor expects to read. Data that the secure element 23 does not expect the processor to obtain is not transmitted to the processor by using the security isolation device. For example, the data that the secure element 23 does not expect the processor to obtain may include fingerprint data, temporary data that is generated during running of the secure element 23 and that is temporarily stored in the random access memory 32, or the data that is loaded into the random access memory 32 and that is of the secure operating system software and the at least one piece of secure application software.

In FIG. 3, the read-only memory 33 may store an on-chip instruction. This part of on-chip instruction is a software instruction program or code stored inside the secure element 23. The on-chip instruction has very high security because of existence of the security isolation, is not capable of being randomly accessed by a device outside the secure element 23, and is very difficult to be rewritten. Optionally, the on-chip instruction may be set to be unmodifiable, and even another device such as the secure processor 31 in the secure element 23 is not capable of rewriting the on-chip instruction. The on-chip instruction may include a boot program instruction required in initialization of the secure processor 31 or other instruction code related to secure operating system switching and a secure operating system upgrade. Before running the secure operating system software and the at least one piece of secure application software, the secure processor 31 reads the boot program instruction from the read-only memory 33 to implement initialization.

In a specific embodiment, in a startup process of the mobile terminal 20, the at least one central processing unit 211 may be first powered on, and the secure element 23 is triggered to power on. In a power-on process of the secure element 23, the read-only memory 33 is similar to a BIOS in a conventional PC, and can ensure that each startup of the secure element 23 begins with reading the boot program instruction in the read-only memory 33, to ensure startup security. For example, when the secure element 23 powers on, the secure processor 31 loads, when driven by the boot program instruction, the secure operating system software into the random access memory 32, to run the secure operating system software. Further, the secure processor 31 may start one or more pieces of secure application software after the secure element 23 is powered on, that is, load the one or more pieces of secure application software into the random access memory 32, to run the secure application system software. Alternatively, the secure processor 31 may start the secure application software by receiving a user instruction or a trigger that is based on another condition.

In the related embodiments of the present invention, the random access memory 32 not only temporarily stores secure operating system software and secure application software that are loaded into the random access memory 32 because they are being run, but also may be configured to store temporary data generated by the running software, that is, the foregoing intermediate data, intermediate operation result, or other information that does not need to be stored for a long time.

Further, the OTP memory 34 in FIG. 3 may be configured to store a security parameter of the secure element 23. The security parameter may selectively include at least one of a root key, a calibration parameter, a configuration parameter, or an enabler parameter. For example, a typical application of the OTP memory 34 is to store a public key required to decrypt a new version. This is described in detail subsequently.

The random access memory 32 in FIG. 3 is integrated in the system on chip 21, and is relatively difficult to be implemented by using an electrically erasable programmable read-only memory (EEPROM) because of a technological reason or the like. Therefore, the random access memory 32 may be implemented by selectively using an SRAM, a DRAM, an SDRAM, a DDR SDRAM, or the like, and may have a capacity of hundreds of KBs (kilobyte) currently. Therefore, the capacity of the random access memory 32 is far less than that of an external storage device, for example, a capacity of any memory in the memory system 22.

Further, the secure element 23 further includes a DMA controller 37 coupled to the secure bus 35. The DMA controller 37 is configured to read data from the random access memory 32 and output the data to the secure bus 35, or write data into the random access memory 32 by using the secure bus 35. For example, when data needs to be transmitted to the random access memory 32 through the isolation memory 36 by using the secure bus 35, a related transmission operation may be performed by the DMA controller 37 and does not need to be performed by the secure processor 31. Therefore, the DMA controller 37 in this embodiment of the present invention replaces the secure processor 31 in performing data transfer and migration. For a specific working principle, refer to descriptions in the prior art. Details are not described herein. A variety of data transmission or migration performed by the secure element 23 or the secure processor 31 described in the following embodiments may mean that the DMA controller 37 is driven to perform the data transmission or migration.

Further, the secure element 23 further includes an anti-attack system, to improve security. The anti-attack system may include various anti-attack means or anti-attack devices, for example, an anti-attack metal layer 38 and an anti-attack sensor 39. The anti-attack sensor 39 is configured to detect whether various working parameters of the secure element 23 are abnormal, generate a trigger signal when an anomaly occurs, and transmit the trigger signal to the secure element 23, to trigger at least one of the following operations: alarming the secure element 23, resetting the secure processor 31, or resetting or clearing the random access memory 32 or at least one register in the secure element 23. Specifically, the working parameter includes at least one of a voltage, a current, a clock frequency, a temperature, or a laser intensity.

The anti-attack metal layer 38 is formed, based on a metal mask layer, on a semiconductor chip on which the system on chip 21 is located, manufactured by using a semiconductor integrated circuit manufacturing technology, and used to detect an external physical detection or attack. When an external physical detection or attack is inflicted on the system on chip 21, the anti-attack metal layer 38 can detect the detection or the attack, generate a trigger signal, and transmit the trigger signal to the secure element 23, to trigger at least one of the following operations: alarming the secure element 23, resetting the secure processor 31, or resetting or clearing the random access memory 32 or at least one register in the secure element 23.

Further, in FIG. 3, the secure element 23 further includes a cryptosystem 30 that specifically includes at least one of the following: a cipher engine 301, a MAC computation engine 302, a key manager 303, and a random number generator 304, and that is configured to implement operations such as various security-related processing and computation. Details are described subsequently.

The central processing unit 211 may run general-purpose operating system software and trusted execution environment software. The general-purpose operating system software and the trusted execution environment software may be integrated as a set of software or may be separate software modules. The general-purpose operating system software forms a general-purpose operating system software environment that is referred to as a general-purpose environment for short. The central processing unit 211 performs regular application processing and computation in the general-purpose environment. The central processing unit 211 forms a trusted execution environment based on the trusted execution environment software, and performs trusted computation in the trusted execution environment. The secure processor 31 inside the secure element 23 runs the secure operating system software. Such data computation or processing performed based on the secure operating system software has very high security. Therefore, it may be considered that the secure element 23 runs a secure operating system in a secure environment. The secure environment is formed when the secure processor 31 runs the secure operating system software, and has security higher than the trusted execution environment. However, security of the trusted execution environment is higher than that of the general-purpose environment. A variety of data generated in the trusted execution environment and data of the general-purpose environment may be stored in a same memory, for example, the memory system 22, but are isolated from each other, that is, stored in different areas of a same storage device to ensure security.

Figure 4:
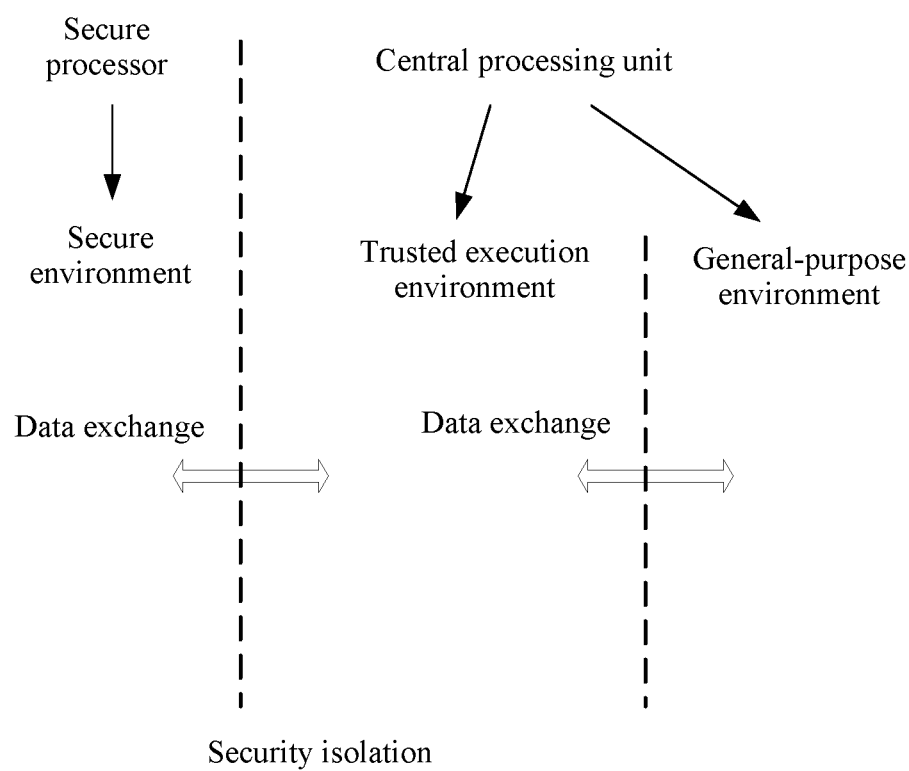
FIG. 4 is a simplified schematic diagram of an operating environment of a mobile terminal according to an embodiment of the present invention.

As shown in FIG. 4, a system on chip 21 may have the foregoing three running environments, including a trusted execution environment and a general-purpose environment that are formed by a central processing unit 211 and a secure environment formed by a secure element 23. Data may be exchanged between the trusted execution environment and the general-purpose environment. The two environments are respectively generated based on two independent software systems such as an Android system and a trusted execution environment software system, and are used for service processing of different security. Data may be exchanged between the trusted execution environment and the secure environment formed by a secure processor 23. As described above, security isolation exists between the trusted execution environment and the secure environment. That is, data is exchanged by using the foregoing dedicated transmission channel. Though the trusted execution environment and the general-purpose environment are both run by one or more central processing units 211, general-purpose operating system software and a running program of common application software based on the general-purpose operating system are not capable of randomly accessing the trusted execution environment. Therefore, it may be considered that security isolation in a specific form also exists between the trusted execution environment and the general-purpose environment, so that data in the trusted execution environment is not capable of being randomly accessed from the general-purpose environment, and data is exchanged by using a specific interface between the two environments. Therefore, each environment may be considered as a result obtained after permission setting, data based on an environment is not capable of being randomly accessed by software or hardware based on another environment, and such access needs to be performed by using a specific interface.

For example, when the central processing unit 211 needs to communicate with a device, for example, a secure processor 31, in the secure element 23, the central processing unit 211 may generate, in the general-purpose environment, indication information, for example, indication information triggered by a user; then convert the indication information in the general-purpose environment into indication information in the trusted execution environment; and further transmit, in the trusted execution environment, the indication information to the secure element 23. The transmission may be performed through the foregoing dedicated transmission channel. Therefore, the central processing unit 211 may communicate, when driven by the general-purpose operating system software, with the secure element 23 through the trusted execution environment. Alternatively, the central processing unit 211 may directly communicate, when driven by the general-purpose operating system software, with the secure element 23. In this case, though security is slightly reduced, a processing speed is higher.

During interaction between the processing unit 211 and the secure element 23 described in the following embodiments, bidirectional transfer of data or information may or may not be performed through the trusted execution environment. That is, the central processing unit 211 may directly exchange data with the secure element 23 in the general-purpose environment. However, this is not mandatory. The secure element 23 may access an external memory under control of the central processing unit 211, for example, obtain running data from a memory system 22 or transfer data to a memory system 22. Control information, for example, an access address by which the central processing unit 211 indicates a memory to the secure element 23 or the secure processor 31, required for the access is generally transmitted through the trusted execution environment. However, this is also not mandatory.

The secure processor 31 may support multiple pieces of secure operating system software or multiple pieces of COS software. In addition, the secure processor 31 may dynamically switch between multiple secure operating systems. Significance of implementing such switching lies in the following: Various secure application requirements, such as, mobile payment and various SIM functions, are currently developing rapidly, and a quantity of secure application software that one piece of secure operating system software needs to support is increasing. Once a problem arises in the secure operating system software or a new requirement emerges, the operating system software needs to be re-designed. In addition, for the sake of security, a new system needs to be re-certified by a security authority such as a government agency. The frequent software modification and re-certification increase a development difficulty. To resolve the foregoing problem, a solution in which the secure element 23 supports at least two pieces of secure operating system software is fairly good. If the secure element 23 is capable of supporting multiple pieces of secure operating system software, an implementation is more flexible. For example, a piece of secure operating system software supports various payment or financial services related to a bank card and has very high security, and another piece of secure operating system software may be constantly upgraded and re-certified, so as to avoid an update and re-certification of an entire system because only one piece of secure operating system software is used. In addition, a person skilled in the art may also flexibly add more secure operating system software to the secure element 23, to further enrich service types supported by the secure element 23. Multiple pieces of secure operating system software are independent from each other. Therefore, when the secure element 23 runs any system, another system is not affected, so that security is not reduced. For example, first secure operating system software A that is run does not randomly obtain information of second secure operating system software B. The secure element 23 may achieve the foregoing effect by means of real-time and dynamic switching between different secure operating system software. More details about switching between secure operating system software are described in the following embodiments.

Figure 5:
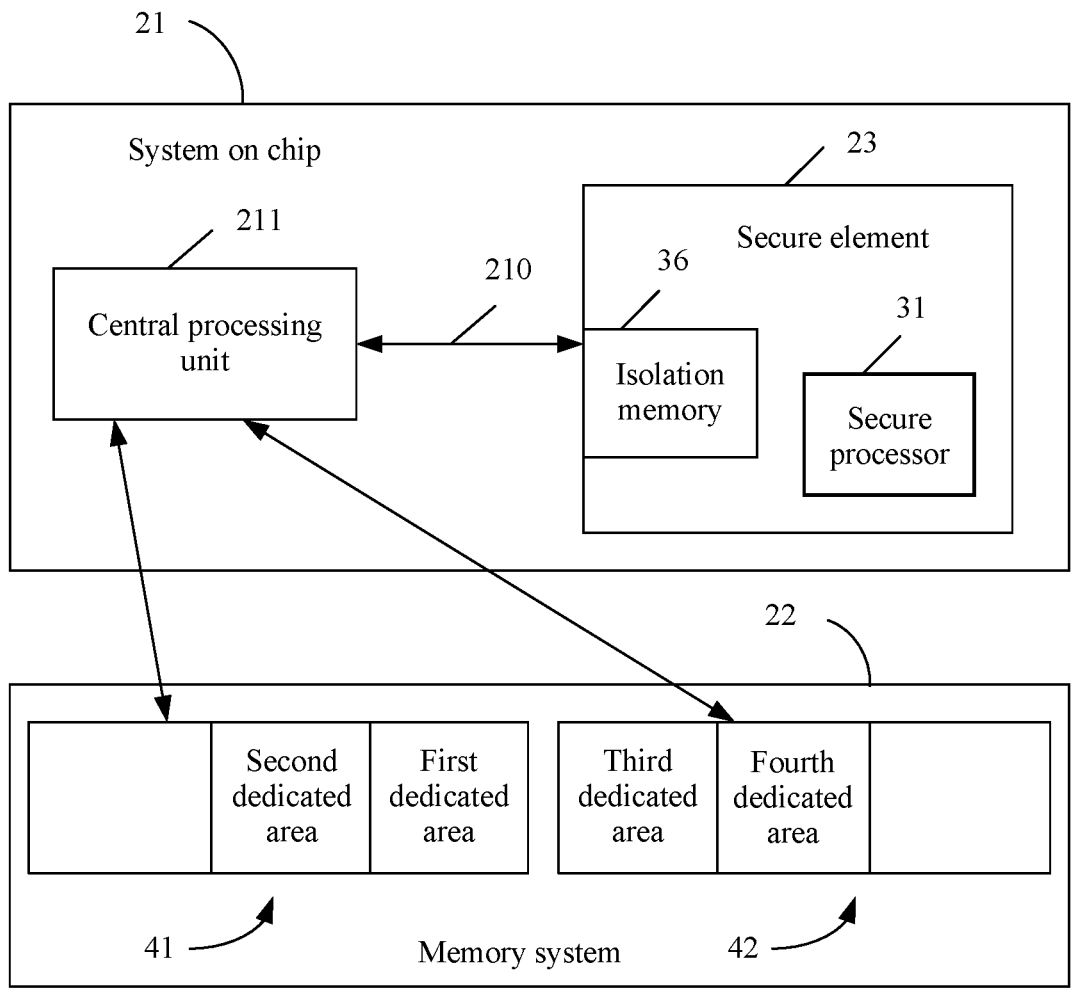
FIG. 5 is a simplified schematic diagram of an exchange relationship between a system on chip and an external memory system according to an embodiment of the present invention.

As shown in FIG. 5, a memory system 22 may include a volatile memory 41 and a non-volatile memory 42. The volatile memory 41 may be referred to as a second memory, and can be used to store a variety of data that does not need to be stored for a long time. For example, process data generated during running of software does not need to be stored for a long time, and may be lost after a device or an apparatus is powered off. The non-volatile memory 42 may be referred to as a third memory. Different from a variety of data that does not need to be stored for a long time, data stored in the non-volatile memory 42 may be stored for a long time. A central processing unit 211 in a system on chip 21 may be coupled to the volatile memory 41 and the non-volatile memory 42. Optionally, the volatile memory 41 and the non-volatile memory 42 may also be coupled to a secure element 23, for example, exchange information with a secure processor 31 by using the foregoing dedicated transmission channel. The volatile memory 41 and the non-volatile memory 42 may be respectively located on a second semiconductor chip and a third semiconductor chip.

Specifically, different dedicated areas for different secure operating system software may be obtained by means of division in the volatile memory 41, for example, a first dedicated area and a second dedicated area, which are respectively used to store a variety of running data of first secure operating system software and second secure operating system software or store other data that does not need to be stored for a long time. The volatile memory 41 has different dedicated areas for different secure operating systems. Therefore, storage of the different secure operating system software does not affect each other. Further, different dedicated areas for different secure operating system software may be obtained by means of division in the non-volatile memory 42, for example, a third dedicated area and a fourth dedicated area, which are respectively used to store the first secure operating system software and the second secure operating system software, so that system software data is not lost even if a system is powered. The volatile memory 41 and the non-volatile memory 42 may be further configured to store a large amount of other data, such as data of the central processing unit 211 and a communication processor 213. However, a dedicated area is obtained by means of division for each piece of secure operating system software in the secure element 23, ensuring security of the related software.

The volatile memory 41 is located outside the system on chip 21, and therefore, may have very large space, and may selectively store running data of multiple pieces of secure operating system software that are not running, so that the running data can be conveniently reloaded into the secure element 23 subsequently. Therefore, secure operating system switching can be implemented dynamically at any time, and a switching time is reduced. For details, refer to descriptions in the following embodiments. The volatile memory 41 may further be an SRAM, a DRAM, or an SDRAM. A capacity of the volatile memory 41 may be far larger than that of a random access memory 32 inside the system on chip 21. For example, a capacity of the internal random access memory 32 may be 500 k to 600 k (kilo) bytes KBytes (kilo), while the capacity of the external volatile memory 41 is generally multiple G bytes. This design simplifies a design of the internal random access memory 32 and allows the external volatile memory 41 to be fully used without compromising security.

The non-volatile memory 42 is located outside the system on chip 21, and therefore, may have very large space. Different from the volatile memory 41 that merely serves as a temporary storage device required to run a secure operating system, the non-volatile memory 42 may store data for a long time, for example, may still store information such as corresponding secure operating system software or a corresponding key and check value after an entire mobile terminal device 20 is powered off. A capacity of the non-volatile memory 42 may be far larger than that of a read-only memory 33. The read-only memory 33 may be configured to store only an on-chip instruction with very high security. More details are described subsequently.

The following describes switching between multiple secure operating systems. When secure operating system switching is performed, the secure processor 31 may run a part of instruction code inside the read-only memory 33 or another software program bound to secure operating system software that is being run, to initiate the switching. A switching initiation process may be triggered by a user. Based on the trigger, the central processing unit 211 may instruct the secure processor 31 that the switching needs to be performed. Therefore, this is equivalent that the secure processor 31 determines, under control of the central processing unit 211, that the secure processor 31 needs to terminate a piece of secure operating system software that is running, and switch to another piece of secure operating system software.

Figure 6:
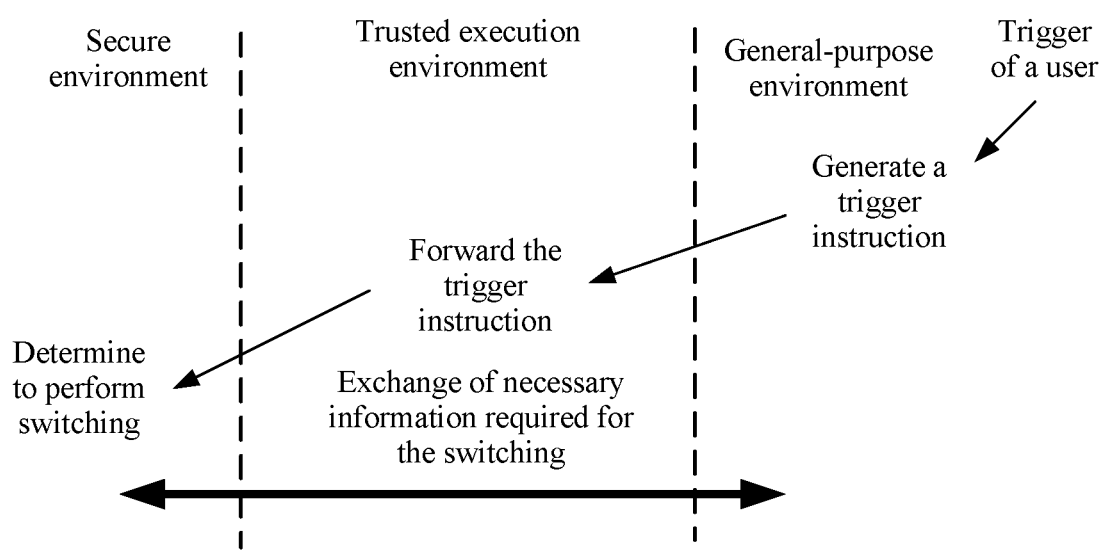
FIG. 6 is a simplified schematic diagram of a procedure of triggering secure operating system switching according to an embodiment of the present invention.

Referring to FIG. 6, a central processing unit 211 runs general-purpose operating system software, and generates a trigger instruction based on a general-purpose environment. Optionally, the trigger instruction may be from a user. For example, a system on chip 21 may receive a trigger message from the user by using an input interface. The input interface may be included in a system peripheral interface 215. Optionally, the input interface may be an interface used to connect a keyboard or a touch-based input device, and may be configured to connect to a corresponding input unit 104 in FIG. 1. When driven by the general-purpose operating system software, the central processing unit 211 receives the trigger message from the input interface, and generates the trigger instruction, that is, generates the trigger instruction in the general-purpose environment. The central processing unit 211 transmits the trigger instruction to a secure processor in a trusted execution environment formed by trusted execution environment software. That is, the central processing unit 211 converts the trigger instruction in the general-purpose environment into a trigger instruction in the trusted execution environment, and transmits the trigger instruction to the secure processor 31. The secure processor 31 determines, based on the trigger instruction, that switching needs to be performed, that is, a subsequent switching trigger process is to be performed. Alternatively, the central processing unit 211 may receive the trigger message from the input interface and generate the trigger instruction in the trusted execution environment, to improve security.

After determining that switching needs to be performed, the secure processor 31 exchanges, with the central processing unit 211, necessary information required for the switching, such as switching indication information and process indication information. For example, when a switching process is indicated to the user by using a UI, the secure processor 31 initiates indication information in a secure environment, and transmits the indication information to the general-purpose environment through the trusted execution environment, so that the central processing unit displays, when driven by the general-purpose operating system software, the related indication information by using the UI. Alternatively, the UI may be generated in the trusted execution environment and is a trusted UI. Therefore, the indication information is not transmitted through the general-purpose environment, featuring higher security. For another example, data information related to the switching may be transmitted between the trusted execution environment and a secure environment, so that the data information related to the switching is transferred between an internal random access memory 32 and an external memory, for example, between a volatile memory 41 and a non-volatile memory 42, thereby implementing secure operating system switching.

Each piece of secure operating system software may include a dedicated identifier. For example, first secure operating system software has an identifier COS A, and second secure operating system software has an identifier COS B. The secure processor 31 may identify the secure operating system software by using the identifier, and may maintain the identifier in a secure element 23. A maximum quantity of secure operating system software that can be supported by one secure element 23 may be determined by a mobile terminal manufacturer or determined by a chip manufacturer or a chip designer.

In a possible implementation, if the secure processor 31 needs to switch from running the first secure operating system software to running the second secure operating system software, the secure processor 31 suspends running of the first secure operating system software, temporarily stores running data of the first secure operating system software in a first dedicated area that is in the volatile memory 41 outside the system on chip 21 and that is corresponding to the first secure operating system software, and then transmits, through the secure environment to the trusted execution environment formed by the central processing unit 211, information indicating that storage is completed, to indicate that the first secure operating system software has been transferred outside the system on chip 21. Suspension of running of a secure operating system may also be referred to as interruption of running of the secure operating system. The suspension is suspension of an operation-state of the secure operating system inside the secure element 23.

After the suspension or the interruption occurs, the secure processor 31 performs resetting and rebooting. For details, refer to subsequent descriptions of S708 in FIG. 7 and S801 in FIG. 8. After performing the booting, the secure processor 31 transmits, through the secure environment, indication information to the trusted execution environment formed by the central processing unit 211. The central processing unit 211 obtains, from a second dedicated area that is in the volatile memory 41 and that is corresponding to the second secure operating system software, the second secure operating system software that is confirmed by the user and that the secure processor 31 needs to switch to; and transmits the second secure operating system software to the secure processor 31 in the trusted execution environment. In this case, the second secure operating system software is software whose running has been suspended by secure operating system switching. That is, running of the system software has been previously suspended, and the system software is temporarily stored and is a suspended system. Alternatively, the central processing unit 211 obtains, from a fourth dedicated area that is in the non-volatile memory 42 and that is corresponding to the second secure operating system software, the second secure operating system software that is confirmed by the user and that the secure processor 31 needs to switch to; and transmits the second secure operating system software to the secure processor 31 in the trusted execution environment. In this case, running of the second secure operating system software has not been suspended by secure operating system switching. That is, the second secure operating system software is newly started software, and has not been run, suspended, or interrupted previously. Program code of the second secure operating system software is stored in the non-volatile memory 42 for a long time.

It may be understood that the secure element 23 or the secure processor 31 needs to interact with the volatile memory 41 or the non-volatile memory 42 outside the system on chip 21 through the trusted execution environment. That is, the central processing unit 211 transfers, in the trusted execution environment to the outside of the system on chip 21, software data that needs to be temporarily stored after the suspension is performed, and transfers related software data to the secure element 23 from the outside. Alternatively, the secure element 23 may directly access the volatile memory 41 or the non-volatile memory 42 by using a storage interface 245 of the secure element 23. In this way, the secure processor 31 temporarily stores software data externally or obtains data from the outside without using the trusted execution environment; and may directly access, by using the storage interface 245 of the secure processor 31, a corresponding area in the volatile memory 41 or the non-volatile memory 42. In this case, the secure processor 31 needs to receive indication information from the central processing unit 211, and learn, from the indication information, of a corresponding dedicated area that needs to be accessed by the secure processor 31 in the volatile memory 41 or the non-volatile memory 42. Specifically, the secure processor 31 may transfer the software data by invoking or controlling a DMA controller 37.

It may be understood that an operation of suspending secure operating system software is to determine to clear running data of the secure operating system software from the internal random access memory 32. Specifically, the running data of the secure operating system software may be migrated to the external volatile memory 41. However, the running data is not completely removed from a mobile terminal 20, but is transferred to the external memory. The running data is just cleared from the inside of the secure element 23 or replaced with other initialization data before the secure processor 31 switches to running another system.

That is, this is equivalent that the secure operating system software is not completely disabled, and the secure element 23 may switch back to the secure operating system software at any time. The running data, cleared from the internal random access memory 32 during the switching, of the secure operating system software includes data of a secure operating system whose running is interrupted by the switching and other intermediate data. Once the secure processor 31 switches back to the secure operating system software, an operation that has been interrupted may be resumed immediately.

According to the foregoing technical solution, a speed of switching between multiple pieces of secure operating system software is relatively high. The random access memory 32 does not need to be designed to have a very large capacity, and it is easier to integrate the secure element 23 in the system on chip 21. According to the foregoing solution, the system on chip 21 not only supports the general-purpose operating system software, but also may support coexistence of multiple pieces of secure operating system software, achieving low implementation costs.

To ensure security of the switching, at least one of encryption or MAC computation may be performed on running data of any secure operating system software stored in the volatile memory 41, to form secure data. For example, the encryption and the MAC computation may be selectively performed to obtain the secure data, to ensure that secure processing is performed on the secure data stored outside the system on chip 21. Optionally, sequences of the encryption and the MAC computation are exchangeable. For example, first the encryption and then the MAC computation may be performed on the running data, or first the MAC computation and then the encryption may be performed on the running data.

When the related secure data of the secure operating system software is reloaded into the secure element 23 and is re-run, corresponding decryption or MAC check computation needs to be performed to obtain the running data. The secure processor 31 may drive the cipher engine 301 shown in FIG. 3 to perform the encryption and decryption processes. The secure processor 31 may drive the MAC computation engine 302 shown in FIG. 3 to perform the MAC computation and MAC check computation processes. The cipher engine 301 and the MAC computation engine 302 may be considered as hardware acceleration devices, so that the secure processor 31 is released from corresponding computation processing, thereby improving an operation speed. Certainly, the secure processor 31 may execute software code to perform the encryption, the decryption, or the MAC-related computation. Therefore, the foregoing hardware acceleration devices are not mandatory in this embodiment.

An algorithm used for the encryption and the decryption may be a symmetric encryption algorithm, such as an advanced encryption standard (AES). However, this embodiment is not limited thereto. It may be understood that another appropriate encryption and decryption algorithm may also achieve a similar effect in this embodiment. A typical implementation solution of the MAC computation is Hash computation. The hash computation is a check operation aiming to verify whether the secure data related to the secure operating system software is tampered with or to check integrity of the secure data. Alternatively, the MAC computation may be another verification method or another integrity check method that is used to check whether the stored secure data is tampered with. This embodiment sets no limitation thereto. Therefore, the MAC computation should be understood as a check operation in a broad sense. The check operation is used to check whether data is secure initial data. Once the data is tampered with or incomplete, the check fails, and a switching process is prohibited from being continued.

It may be understood that the foregoing encryption and decryption operations may be performed by using a key that is based on a random number. Different keys may be used for different secure operating system software. For example, a key based on a first random number is used to perform encryption and decryption on first running data of the first secure operating system software, and a key based on a second random number is used to perform encryption and decryption on second secure data of the second secure operating system software. The two random numbers are different. In this way, different secure operating system software is not capable of obtaining data from each other, thereby improving security. The key may be the random number or may be derived from the random number. This embodiment sets no limitation thereto. Specifically, a random number required by any one or more pieces of secure operating system software may be generated by the random number generator 304 shown in FIG. 3.

For example, the random number generator 304 may generate the random number, and the random number is used as the key; or a key manager 303 may further derive the key based on the random number. When running of secure operating system software is suspended and the secure operating system software is temporarily stored in the external volatile memory 41, a key corresponding to the encryption and the decryption or a check value generated from the MAC computation may be stored in a corresponding dedicated area in the non-volatile memory 42. For example, when the first secure operating system software A that is being run by the secure processor 31 is suspended, and first secure data generated after encryption and MAC computation are performed is transferred to the first dedicated area in the volatile memory 41, a first key of the first secure operating system software A and a first check value, for example, a first hash value, generated from MAC computation are stored in an area that is in the non-volatile memory 42 and that is corresponding to the system software A, for example, a third dedicated area.

If the second secure operating system software B that needs to be started by the secure processor 31 is system software that has been run but whose running has been suspended, for example, the second secure data of the second secure operating system software B is stored in the second dedicated area in the volatile memory 41, and a second key required by the second secure operating system software B and a second check value generated from MAC computation are stored in the fourth dedicated area in the non-volatile memory 42, the secure processor 31 may obtain the second key and the second check value from the fourth dedicated area, and use the second key and the second check value to perform secure processing on the second secure data, to obtain running data that can continue to be run by the secure processor 31. Different from the volatile memory 41, the non-volatile memory 42 is a non-volatile memory and can store data for a long time. Therefore, corresponding secure data is still stored and not lost after a device is powered off. The secure data and a parameter required for the encryption, the decryption, and the MAC computation are respectively stored in different memories, so that a better security effect can be achieved.

Optionally, sequences of the encryption and the MAC computation are exchangeable. Therefore, a manner of storing the parameter, for example, the key and the check value, required for the encryption, decryption, and MAC computation in the non-volatile memory 42 is also variable. For example, first the encryption and then the MAC computation may be performed on the running data to obtain the secure data. Therefore, the secure data stored in the random access memory 41 includes encrypted running data, while the corresponding key and check value are stored in the non-volatile memory 42. For another example, first the MAC computation and then the encryption may be performed on the running data. Specifically, the running data and the check value of the MAC computation may be encrypted as a whole, to obtain the secure data to be stored in the random access memory 41. In this case, only the corresponding key is stored in the non-volatile memory 42 because the check value is already stored in the random access memory 41 as a part of the secure data. For another example, after the MAC computation is performed on the running data, the running data and the check value of the MAC computation may be separately encrypted, to obtain encrypted running data that is used as the secure data and an encrypted check value. The secure data is stored in the random access memory 41, while the key and the encrypted check value are stored in the non-volatile memory 42. Specific sequences of the encryption and the MAC computation are not limited in this embodiment. In addition, sequences of the decryption and the MAC check computation may be reverse to the sequences of the encryption and the MAC computation.

In this embodiment, a check value may be obtained by performing the MAC computation on software data, and the check value is maintained. The MAC check computation is to check the software data by using the maintained check value. For example, the same MAC computation may be performed on the software data to generate a new check value, and the new check value is compared with the maintained check value to authenticate whether the software data passes the check. The MAC computation may be hash computation, and the MAC check computation may be hash check computation.

Figure 7:
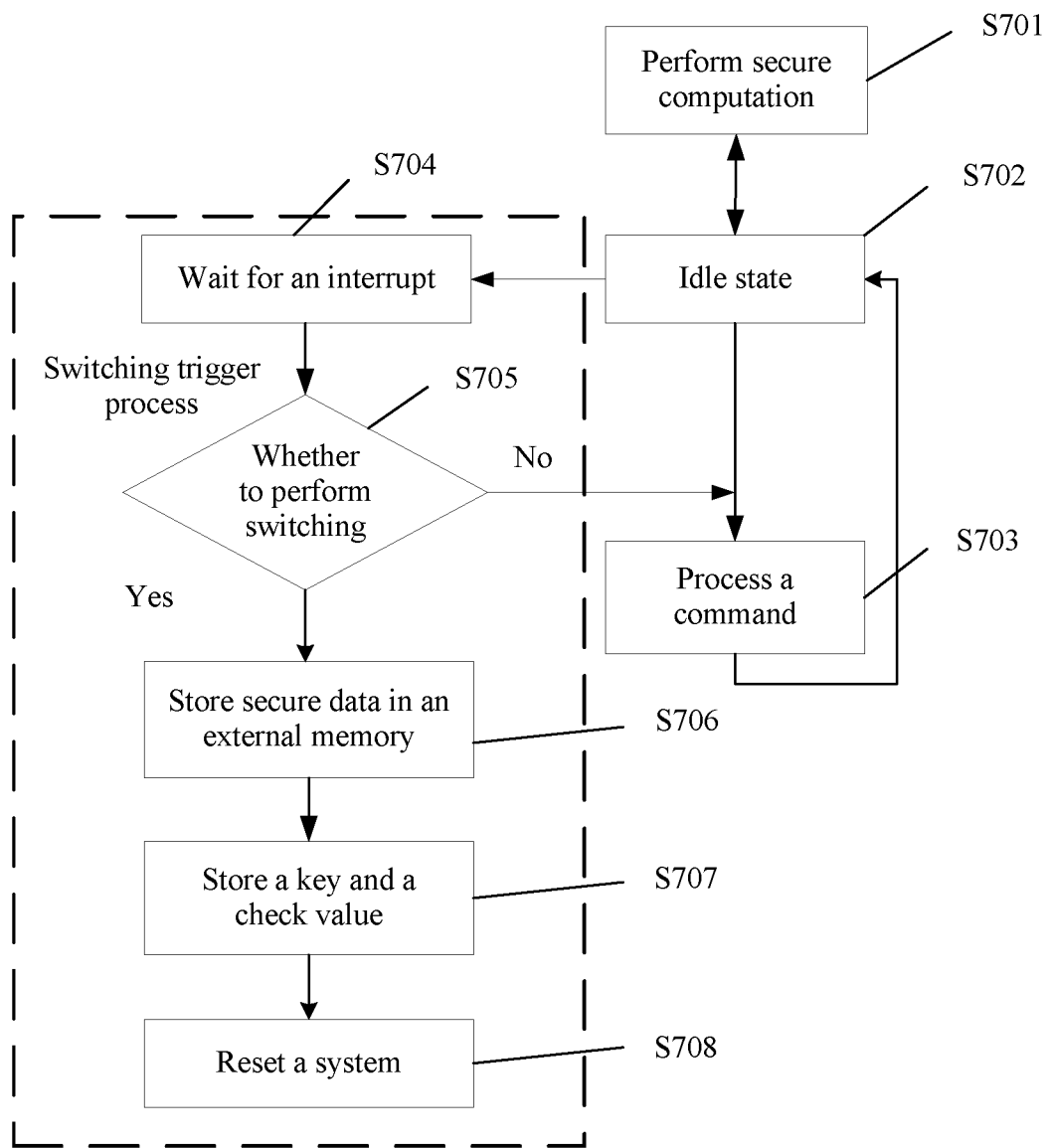
FIG. 7 is a schematic flowchart of an operation for determining that switching needs to be performed according to an embodiment of the present invention.

When secure operating system switching is performed, an operation of a first part is to determine switching. An operation procedure in which a secure processor 31 determines that switching needs to be performed may be shown in FIG. 7. FIG. 7 is specifically corresponding to a procedure for triggering secure operating system switching, that is, interrupting a running system; that is, corresponding to the first half part of the secure operating system switching. In S701, the secure processor 31 performs secure computation, that is, runs secure operating system software and secure application software. For example, the secure computation may be mobile payment processing. A random access memory 32 includes running data of related running software, such as the secure operating system software and the secure application software that are run; and functions as a memory. After the computation is completed, in S702, the secure processor 31 enters an idle state. In this case, it is equivalent that the secure operating system software and the secure application software are in a suspended state, and the secure processor 31 does not perform calculation related to mobile payment. If the idle state lasts for a preset time, a switching trigger process is performed. Specifically, S704 may be performed, in which an interrupt is waited for. If a task of performing a new operation is received before the idle state lasts for the preset time, the secure processor 31 may switch from the idle state in S702 back to a computation state in S701, to re-perform the computation task.

In S704, the secure processor 31 may receive an interrupt. The interrupt may be indication information transmitted to the secure processor 31 by a central processing unit 211 by using a dedicated transmission channel. As described above, the indication information may be initiated by a user on a UI or in another manner. For example, the random access memory 32 currently stores a running secure operating system A and data of an application program of a bank card X that is based on the system A. That is, related functions of the secure operating system A and the bank card X are running. The user may use the UI to trigger the central processing unit 211 and notify the central processing unit 211 that the user expects to run an application program of a bank card Y. An application program of the bank card Y is based on another secure operating system B. In this case, the central processing unit 211 needs to generate an interrupt required to indicate the switching. Besides being triggered by the user, the switching may also be automatically triggered by the central processing unit 211. For example, as artificial intelligence develops, a mobile terminal 20 is increasingly intelligent nowadays. In a specific scenario, the central processing unit 211 may automatically generate the interrupt required for the switching, so that a secure element 23 switches to running another piece of secure operating system software.

In S705, the secure processor 31 determines whether the interrupt indicates the switching. If the interrupt indicates the switching, S706 is performed; otherwise, S703 is performed. In S703, the secure processor 31 processes the interrupt from the central processing unit 211, for example, performs a corresponding operation under instruction of the central processing unit 211, for example, an operation related to mobile payment. For example, the secure processor 31 feeds back information related to the mobile payment to the central processing unit 211, so that the user views the information on the UI. After completing S703, the secure processor 31 may further enter the idle state in S702.

As described in the foregoing embodiment, in S706, the secure processor 31 may suspend running of the secure operating system software, so that all operations related to the system software in the secure processor 31 and the random access memory 32 are suspended by means of the suspension; and determine to initiate data migration. Further, as described in the foregoing embodiment, the secure processor 31 performs secure processing, such as encryption and MAC computation, on the running data of the secure operating system software, to obtain secure data, and migrates the secure data to a corresponding dedicated area in an external volatile memory 41. In S706, the suspension of running of the secure operating system software means that determining that an operation of transferring current data externally needs to be initiated. Not only running of the system software is suspended, but also the corresponding running data is cleared from the internal random access memory 32 in a subsequent operation and is migrated externally, so that the data can be used when the secure processor 31 switches back to the system software for use next time.

In S707, as described in the foregoing embodiment, the secure processor 31 may store, in a corresponding dedicated area in an external non-volatile memory 42, information such as a key and a MAC check value required for the secure processing. Sequences of S706 and S707 are exchangeable. Then, optionally, in S708, the secure processor 31 performs a reset operation, that is, triggers reset of the secure element 23. Data that is in the secure element 23 and is related to the secure operating system software whose running is suspended is cleared by means of the reset. Then, the secure processor 31 may re-execute a boot program, to prepare for switching to next secure operating system software to be run. For details, refer to a process in S801 in FIG. 8 in the following. When the reset is performed, data in the random access memory 32 or another available register inside the secure element 23 is cleared, so that a secure operating system before the switching and a secure operating system after the switching are not capable of obtaining data from each other, thereby improving security.

Before S708, the secure processor 31 may exchange information with the central processing unit 211 by using the dedicated transmission channel, and notifies the central processing unit 211 that the running system software has been suspended or temporarily stored externally to transit to the reset operation in S708. This process is not shown in FIG. 7.

After S708, the secure processor 31 may perform reboot, so that the central processing unit 211 receives information about starting another piece of secure operating system software. For details, refer to an operation in FIG. 8 in the following. The starting another piece of secure operating system software has two possibilities. In one possibility, data required to run the system software is to be obtained from the external volatile memory 41, that is, system software whose running has been suspended or interrupted previously by switching is started instead of new system software. In the other possibility, data is obtained from the external non-volatile memory 42. That is, new system software is started, that is, the system software is started for the first time, and has not been interrupted or suspended previously by any secure operating system switching.

A manner for starting a to-be-started system may be determined by using an interrupt identifier used to indicate whether the system software has been suspended or interrupted. Therefore, in S707, the secure processor 31 may further store, in a dedicated area that is in the non-volatile memory 42 and that is corresponding to the secure operating system software, an interrupt identifier indicating that the secure operating system software is suspended or interrupted. For example, the interrupt identifier may be stored together with the key and the MAC check value in a corresponding dedicated area. A storage process may be shown in FIG. 6. The secure processor 31 in a secure environment sends data to the central processing unit 211 by using the dedicated transmission channel, and the central processing unit 211 may store the information in a corresponding dedicated area in a trusted execution environment. Alternatively, the secure processor 31 may directly perform the storage operation under control of the central processing unit 211 or when booted by the central processing unit 211, and the related information may not be transmitted through the trusted execution environment. In this case, the central processing unit 211 may notify, in the trusted execution environment, the secure processor 31 of an address of a dedicated area in which the related information is to be stored, so that the secure processor 31 may directly store the information in the corresponding dedicated area.

In a possible implementation solution, procedures S701 to S703 in FIG. 7 are functions of the secure operating system software. That is, the secure processor 31 executes the secure operating system software and completes the processing when driven by the secure operating system software. When no secure application computation is performed, that is, the idle state in S702 lasts for the preset time, the secure operating system software drives the secure processor 31 to go to S704. In this case, the secure processor 31 may skip from executing a data computation function of the secure operating system software in the random access memory 32 to the switching trigger process, for example, a process including procedures S704 to S708 in a dashed box in FIG. 7. A program for driving the secure processor 31 to perform the switching trigger process may be a second switching program. The second switching program is bound to the secure operating system software and permanently stored in a corresponding dedicated area in the non-volatile memory 42. The binding may be that the second switching program and the first secure operating system software exist as an integrated software package.

In FIG. 7, the secure operating system software is used to drive the secure processor 31 to perform normal computation such as computation in S701 to S703. If the idle state lasts for a time longer than the preset time, the second switching program bound to the secure operating system software drives the secure processor 31 to perform the foregoing switching trigger process. The second switching program software used to trigger the switching and the executed secure operating system software may be integrated as a whole and stored in a corresponding dedicated area in the external non-volatile memory 42 for a long time. Therefore, it is easy to upgrade or update this part of software. Each time the secure operating system software is started, the second switching program and the secure operating system software are loaded into the random access memory 32 together. Therefore, the second switching program may be equivalent to a part of the secure operating system software to some extent.

In another possible implementation solution, software for driving the secure element 23 to perform the foregoing switching trigger process may be a part of an on-chip instruction in a read-only memory 33, and is referred to as a first switching program herein. The on-chip instruction has very high security. Generally, the read-only memory 33 in the secure element 23 is very difficult to be rewritten from the external, and therefore, has very high security. For example, when the secure processor 31 performs the processes S701 to S703 when driven by the secure operating system software, to enable the secure processor 31 to enter the idle state in S702, after the idle state lasts longer than the preset time, the secure processor 31 switches from executing the secure operating system software to executing the first switching program in the on-chip instruction, and triggers the switching when driven by the first switching program, that is, performs the procedures S704 to S708.

In FIG. 7, running of a secure operating system is suspended by means of the switching trigger operation, and the secure operating system is temporarily stored in the external volatile memory 41. Therefore, the first half part of the secure operating system switching is completed. That is, suspension of running of the first secure operating system software in the secure element 23 is completed. Then, the secure processor 31 may perform a process of starting operating system software that the secure processor 31 is to switch to, that is, continue the latter part of the secure operating system switching. The starting includes determining a startup solution. The startup solution includes two possible solutions: starting a new system (a system whose running has never been suspended by secure operating system switching), and starting a suspended system (a system whose running has been suspended by secure operating system switching). For details, refer to a process in FIG. 8.

Figure 8:
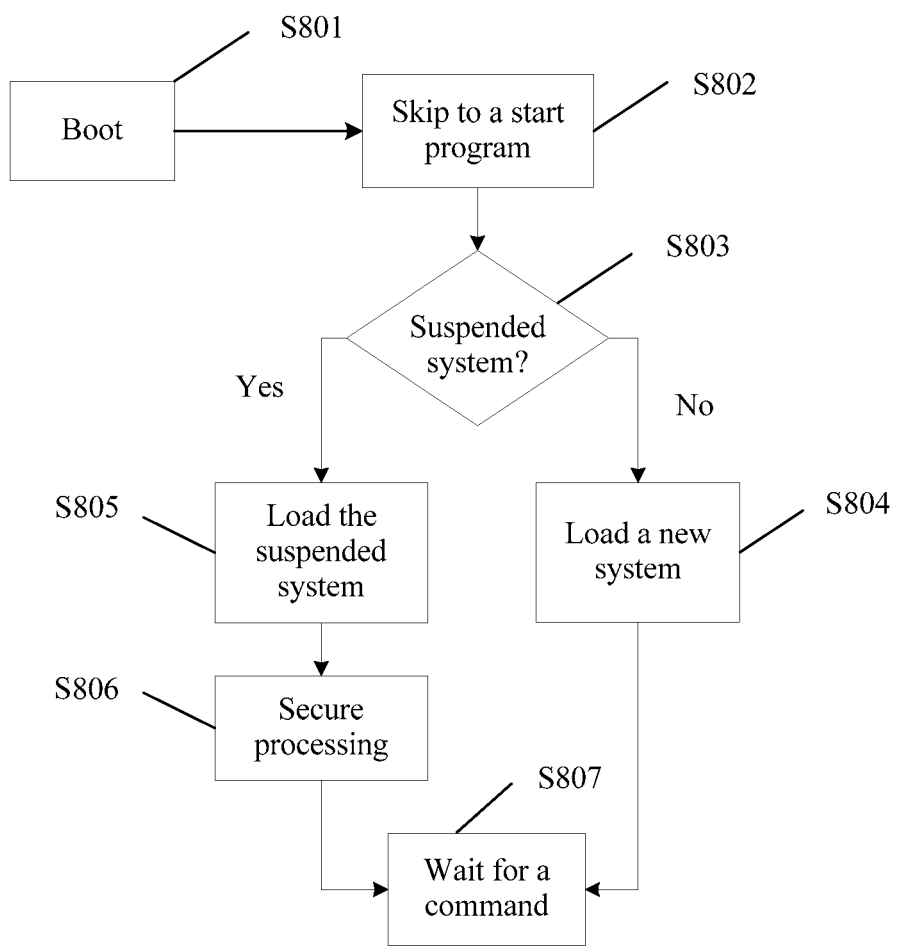
FIG. 8 is a schematic flowchart of determining a startup solution of a secure operating system according to an embodiment of the present invention.

As shown in FIG. 8, FIG. 8 shows a method embodiment in which a solution for starting a secure operating system is determined. FIG. 8 is corresponding to system startup, that is, the latter part of secure operating system switching. Specifically, after S708, a secure processor 31 continues to perform S801. That is, the secure processor 31 may begin with reading an on-chip instruction in a read-only memory 33 inside a secure element 23. Specifically, the secure processor 31 may read a boot program instruction in the on-chip instruction to perform initialization of the secure processor 31, that is, perform reboot. Each time before starting secure operating system software, the secure processor 31 begins with obtaining the boot program instruction in the read-only memory 33, so that startup security can be ensured. In this case, the boot program instruction is similar to a function of a BIOS program in a conventional PC. Further, in S802, the secure processor 31 may further read a startup program included in the on-chip instruction in the read-only memory 33, and executes of the startup program to begin a process of starting secure operating system software that the secure processor is to switch to.

In S803, the secure processor 31 executes the startup program to obtain, from an external non-volatile memory 42, an interrupt identifier of the secure operating system software that needs to be started, and identifies whether the secure operating system software indicated by the interrupt identifier has been suspended or interrupted. In S803, a manner for starting the secure processor 31 is determined. That is, whether a new system or a system whose running has been suspended by switching is to be restarted. Specifically, the secure processor 31 may obtain the related interrupt identifier from the non-volatile memory 42 by using a central processing unit 211. That is, similar to FIG. 6, the central processing unit 211 may transmit, in a trusted execution environment, related information including the interrupt identifier, a key, and a MAC check value to the secure processor 31 by using a dedicated transmission channel; or the central processing unit 211 may transmit, in a trusted execution environment, an address for storing the interrupt identifier, a key, and a MAC check value to the secure processor 31 by using a dedicated transmission channel, so that the secure processor 31 may directly read the interrupt identifier, the key, and the MAC check value from a dedicated area in the non-volatile memory 42.

In S803, if the secure processor 31 determines, according to the interrupt identifier, that the to-be-started system is a suspended system, S805 is performed; otherwise, S804 is performed. The interrupt identifier may be one or more bit values. For example, a bit value 1 is used to indicate that a suspended system is to be started, and a bit value 0 is used to indicate that a new system is to be started. This embodiment sets no limitation thereto. Alternatively, whether the interrupt identifier exists may be determined to indicate and determine whether a new system is to be started. If the secure processor 31 successfully obtains the interrupt identifier, it indicates that a suspended system needs to be started. If the secure processor 31 fails to obtain the interrupt identifier, it indicates that a new system rather than a suspended system needs to be started.

In S804, the secure processor 31 performs a process of loading a new system, that is, loads to-be-started new system software into the secure element 23, and the new system software enters a command waiting state in S807. In S805, the secure processor 31 performs a process of starting a suspended system, that is, reads secure data whose running has been suspended and that is temporarily stored in a corresponding dedicated area in a volatile memory 41, loads the secure data into an internal random access memory 32, and performs a necessary secure computation in S806, to decrypt the related secure data and verify whether the related secure data is tampered with or whether the related secure data is complete. For specific decryption and MAC computation processes, refer to descriptions in the foregoing embodiments. For example, if first encryption and then MAC computation are performed on running data to obtain a check value, MAC check computation may be first performed by using the check value obtained in S803. Once determining that the secure data is secure, decryption may be further performed by using the key obtained in S803, to obtain the running data. If verification of both the decryption and the MAC check computation in S806 succeeds, the running data is re-executed. That is, reloading of the running data is implemented. Specifically, the started secure operating system software may enter the command waiting state in S807. In the state in S807, the started secure operating system software is in an operation-state and waits to receive and process various commands at any time, for example, a mobile payment application.

In the foregoing process, because of existence of the interrupt identifier, the secure processor 31 may determine to obtain, from either the volatile memory 41 or the non-volatile memory 42, the secure operating system software that the secure processor 31 is to switch to. The command waiting state may be equivalent to the idle state in FIG. 7. In this state, the internal random access memory 32 has the running data that is being run, but the secure processor 31 does not perform computation processing on the running data.

In FIG. 8, the secure processor 31 performs S802 to S806 when driven by the startup program in the on-chip instruction in the read-only memory 33. When S807 needs to be performed, the secure processor 31 runs data that is of the secure operating system software and that has been loaded into the random access memory 32, and executes the started secure operating system software to implement a related function.

In FIG. 8, for the loading process in S804, the secure processor 31 obtains, from a corresponding dedicated area in the non-volatile memory 42, data of the secure operating system software and loads the data into the internal random access memory 32, so that the new system is run subsequently. This process is regarded as initial loading. Similar to obtaining the secure data of the suspended system from the volatile memory 41, the secure processor 31 may obtain, under control of the central processing unit 211, data of the new system by using the dedicated transmission channel, where the data is transmitted by the central processing unit 211 in the trusted execution environment. Alternatively, the secure processor 31 may obtain, in the trusted execution environment and under control of the central processing unit 211, a storage address of a dedicated area that is in the non-volatile memory 42 and that is corresponding to the running data, and automatically obtain the running data based on the storage address. This embodiment sets no limitation thereto. Optionally, execution of new secure operating system software may be similar to execution of restarted secure operating system software that has been run, and some necessary computation such as the decryption and the MAC check computation may also be performed. For specific operations, refer to the foregoing procedures. However, a parameter used in the decryption and the MAC check computation during startup of the new system is different from that used in the decryption and the MAC check computation for the suspended system. Details are not described in this embodiment.

It may be understood that, in this embodiment of the present invention, the reset operation in S708 and the reboot in S801 that are performed on the secure element 23 are not mandatory in all switching. That is, after running of secure operating system software is suspended and the secure operating system software is temporarily stored in the external volatile memory 41, other to-be-started secure operating system software may be directly started. In this case, for secure processing, a key required for the encryption and the decryption and a check value related to the MAC computation may be stored inside the secure element 23, instead of being stored in a corresponding dedicated area in the external non-volatile memory 42. For example, the key and the check value are stored in the random access memory 32 or another storage unit inside the secure element 23. Because there is no reset operation during the switching, the key and the check value are not lost. In this case, the interrupt identifier may also be stored inside the secure element 23, for example, stored in the random access memory 32 or another storage unit inside the secure element 23, and does not need to be stored in an external device. It may be understood that if the reset operation in S708 and the reboot in S801 are omitted, security is slightly reduced, but a switching speed is increased.

Alternatively, the foregoing embodiment has mentioned that the external volatile memory 41 is used to store the secure data of the secure operating system software, while the non-volatile memory 42 is used to store the corresponding interrupt identifier, key, and MAC check value. Actually, the interrupt identifier, the key, and the MAC check value may also be stored in the external volatile memory 41 that is frequently accessed and easy to be erased. In this case, a processing speed is increased, but security is slightly reduced.

Any secure operating system software stored in a dedicated area in the non-volatile memory 42 may be upgraded. Because the non-volatile memory 42 is a primary memory of an entire mobile terminal device 20, it may be understood that a large amount of data can be stored in the non-volatile memory 42. If secure upgrade needs to be performed on secure operating system software in a dedicated area, for details, refer to a process in FIG. 9. In S901, a secure processor 31 determines to enter an upgrade mode. The secure processor 31 may receive an indication in a state of executing the secure operating system software, for example, in the idle state in S702 shown in FIG. 7, to determine to enter the upgrade mode. Specifically, the indication of the upgrade may be from a central processing unit 211. The indication may be sent to a secure element 23 in a trusted execution environment by using a dedicated transmission channel and obtained by the secure processor 31. The indication may include necessary information, such as an identifier of to-be-upgraded secure operating system software, for example, a COS A, so that the secure processor 31 learns that first secure operating system software corresponding to the COS A needs to be upgraded.

In S902, the secure processor 31 skips from the state of executing the secure operating system software to executing an upgrade instruction. The secure processor 31 may load upgrade software, that is, downloaded new software, into an internal random access memory 32. The downloaded new software may be from the central processing unit 211, and may be downloaded by the mobile terminal 20 by using a communication processor 213. The central processing unit 211 may send the new software to the secure element 23 in the trusted execution environment by using the dedicated transmission channel, and store the new software in the internal random access memory 32. In this process, the secure processor 31 may also selectively drive another component in a cipher engine 301 or in a cryptosystem system 30 to perform necessary decryption or other secure computation on the downloaded new software.

In S903, the secure processor 31 may perform authentication on the new software to determine that the new software is secure. For example, the authentication may be MAC check computation used in the switching mentioned in the foregoing embodiments. Certainly, a specific MAC computation algorithm may be different from a MAC computation algorithm used in the switching. In S904, the secure processor 31 obtains a storage address of the new software from the central processing unit 211. The address may be allocated by the central processing unit 211 and is a newly allocated dedicated area in the external non-volatile memory 42. After the upgrade succeeds, an original dedicated area that is in the non-volatile memory 42 and that is corresponding to software of an earlier version is released. Alternatively, the secure processor 31 may automatically allocate the address and notify the central processing unit 211. Alternatively, the new software may directly overwrite the current secure operating system software. In this case, no storage address needs to be reallocated.

Optionally, in S903, an OTP memory 34 in the secure element 23 may store a public key used to perform decryption on an encrypted check value used in the MAC check computation. As described above, the MAC computation algorithm may be hash computation. A specific hash operation algorithm may be the same as or different from hash computation algorithm used in the switching. The new software may include secure operating system software of a new version and an encrypted check value. The new software may be downloaded from a server on a network side. The encrypted check value is obtained after the server encrypts a check value by using a private key. Therefore, asymmetric key algorithms are used in encrypting and decrypting the check value. In S903, the secure processor 31 may use the corresponding public key in the OTP memory 34 to perform decryption on the check value included in the new software, to obtain the check value, use the check value to perform hash check computation on the secure operating system software of the new version, to authenticate whether the secure operating system software passes check, and perform subsequent processes after the secure operating system software passes the authentication. For example, the secure processor 31 may drive the cipher engine 301 and a MAC computation engine 302 to respectively perform the decryption operation and the authentication operation. The secure processor 31 may obtain the public key from the OTP memory 34 and send the public key to the cipher engine 301. Generally, to improve security, the public key may be further designed to be invisible to the secure processor 31. That is, the secure processor 31 drives the cipher engine 301 to perform an operation of obtaining the public key, and the cipher engine 301 obtains the public key from the OTP memory 34. Therefore, the public key is not capable of being obtained by the secure processor 31 or a variety of software including the secure operating system software, further improving security. Optionally, the public key may be written into the OTP memory 34 by a device designer or a device foundry when the mobile terminal 20 is manufactured or designed, or may be written by a chip designer or a chip manufacturer when a system on chip 21 is manufactured or designed, and the public key is not capable of being modified after being written.

In S905, the secure processor 31 may determine whether a version number of the new software is greater than a version number of the to-be-updated secure operating system software, to prevent occurrence of a rollback. The version number of the new software may be included in the loaded new software, that is, in the upgrade software. It may be understood that sequences of S903, S904, and S905 are exchangeable. Alternatively, S904 may be advanced, for example, may be performed before S902.

Specifically, in S905, the secure processor 31 may obtain a current version number maintained in the secure element 23, and compare the current version number with the version number of the new software. If the version number of the new software is not greater than the current version number, the upgrade is not continued, to prevent occurrence of a rollback. Rollback prevention is to avoid that the version of the new software is earlier than or the same as a version of currently used software. Specifically, the current version number may be stored in the OTP memory 34. Each time performing an upgrade, the secure processor 31 may write a new version number into the OTP memory 34, to be used to prevent a rollback in a next upgrade. Optionally, the secure processor 31 may write the new version number into the OTP memory 34 after S906. In S906, the secure processor 31 stores the new software in the newly allocated dedicated area that is in the non-volatile memory 42 and that is corresponding to the storage address, to complete the upgrade. This storage process is similar to the previously mentioned operation of storing secure data in a dedicated area in a volatile memory 41. Details are not described herein again. Alternatively, the secure processor 31 may directly use the new software to overwrite the current old software, to complete the upgrade.

Figure 9:
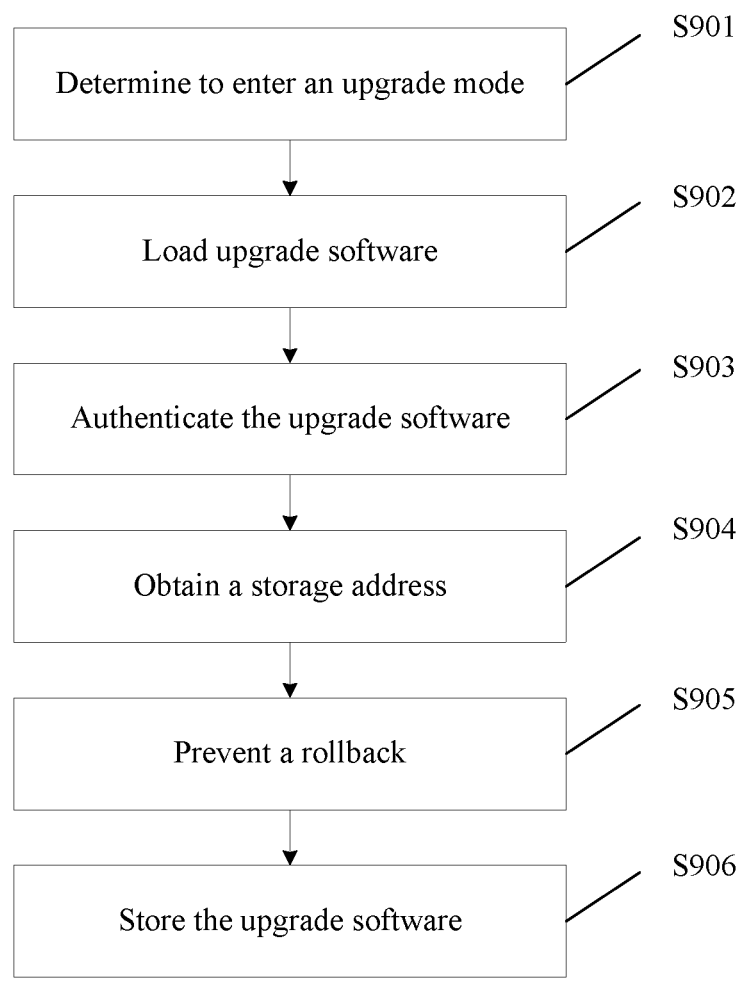
FIG. 9 is a schematic flowchart of upgrading secure operating system software according to an embodiment of the present invention.

In FIG. 9, processing procedures from S902 to S906 may be completed by the secure processor 31 when driven by an upgrade instruction in an on-chip instruction in a read-only memory 33. When an upgrade needs to be performed, for example, after being triggered by a user on a UI or triggered in another form, the central processing unit 211 may send, based on the trigger, the secure processor 31 information indicating that the upgrade needs to be performed, where the information is sent in the trusted execution environment by using the dedicated transmission channel. The secure processor 31 may skip, after being triggered by the indication information, to execute the upgrade instruction, that is, determine to enter the upgrade mode in S901. For example, if the secure processor 31 is in a state of executing the secure operating system software, for example, in the idle state in S702 shown in FIG. 7, and is triggered to perform S901, the secure processor 31 then directly skips from executing the secure operating system software to executing the upgrade instruction in the internal read-only memory 33, and completes S902 to S906 when driven by the upgrade instruction.

To further ensure security, when actually running secure operating system software, the secure processor 31 may perform, when driven by the secure operating system software, various corresponding secure operations such as encryption and decryption of secure application data in mobile payment. The encryption and the decryption also require one or more keys. One or more keys required by each piece of secure operating system software in actual use may be generated based on one root key. The root key is referred to as a system key. Different secure operating system software usually uses different system keys, and a secure operating system that is run is not capable of accessing a system key of another secure operating system. A secure operating system may derive various required private keys according to a system key of the secure operating system, to perform a variety of encryption and decryption computation during running of the secure operating system or corresponding secure application software.

In a possible implementation, after S806 in FIG. 8, that is, after the decryption and the MAC check computation succeed, the secure element 23 may generate a system key for the secure operating system software. For example, the OTP memory 34 may store a system root key of the entire secure element 23. The system root key may be written by a device designer or manufacturer or a chip designer or manufacturer before device delivery, and is not capable of being modified. After S806, the key manager 303 shown in FIG. 3 may generate, based on the system root key, a system key used by each piece of secure operating system software. The system key may be locked up in a register inside the key manager 303 and is not capable of being read externally. An algorithm for generating the system key may be preconfigured in the key manager 303. Each time after secure operating system software is restarted, the secure processor 31 may invoke or drive, when driven by a startup program, the key manager 303 to generate, according to the system root key and necessary information of the secure operating system software, for example, information such as the foregoing identifier COS B, a system key corresponding to the secure operating system software. The system root key remains unchanged and the necessary information of the secure operating system software remains unchanged. Therefore, for each piece of secure operating system software, a same system key is generated after each restart, and use of the system key is not affected.

Optionally, before the secure processor 31 runs the first secure operating system software, a corresponding first system key is generated. Before the secure processor 31 runs second secure operating system software, a corresponding second system key is generated. Generally, the first secure operating system software and the second secure operating system software are not simultaneously run by the secure processor 31. Therefore, the first secure operating system software and the second secure operating system software are not capable of accessing a system key of each other, thereby ensuring security. The system root key used to generate each system key is stored in the OTP memory 34 and is not capable of being modified, and each piece of secure operating system software is not capable of accessing the system root key. The key manager 303 may generate, when driven by the secure processor 31, a corresponding system key according to the system root key and necessary information of secure operating system software. However, it may be designed that the secure processor 31 is not capable of obtaining the system root key, so as to ensure security.

Each time switching is performed, after secure operating system software is suspended, the secure element 23 needs to be reset, so that a system key of the secure operating system software does not remain in the secure element 23 and is not capable of being obtained by another piece of secure operating system software. When the system key is used, the secure processor 31 may drive the cipher engine 301 or the key manager 303 to perform related encryption and decryption computation. However, the secure processor 31 may not maintain the system key. That is, the system key is invisible to the secure processor 31 and the secure operating system software, thereby ensuring security. For example, the key manager 303 completely locks up the system key in the register inside the key manager 303 until reset and reboot occur because of next switching.

It may be understood that all or some steps of a method or a procedure that is performed by software and that is in the embodiments of the present invention may be implemented in a form of a software functional unit and sold or used as an independent product. The related software functional unit may be a computer program product and may be stored in a computer readable storage medium. The computer program product may be used to control the secure processor 31 in the secure element 23 to support switching between multiple secure operating systems. The computer program product may include the on-chip instruction in the internal read-only memory 33 mentioned in the foregoing embodiments, and may further selectively include all some software of general-purpose operating system software, common application software based on the general-purpose operating system software, secure operating system software, and at least one piece of secure application software based on the secure operating system software. Based on such an understanding, at least some technical solutions corresponding to the method may be implemented in a form of computer code. The computer code may be stored in a storage medium, such as the various random access memories or read-only memories, or various other volatile or non-volatile storage devices mentioned above. The computer code may include several software instructions for instructing a computer device (which may be the previously mentioned mobile terminal 20 or system on chip 21, or the like) to perform all or some steps of the corresponding method.

As described above, most operations in main processes in this embodiment, such as an operation process of determining that switching needs to be performed corresponding to FIG. 7, a process of determining a solution for starting a secure operating system corresponding to FIG. 8, and a process of upgrading a secure operating system corresponding to FIG. 9, may be implemented by using the on-chip instruction in the internal read-only memory 33. Alternatively, some software instruction functions of the on-chip instruction may be implemented by secure operating system software.

Figure 10:
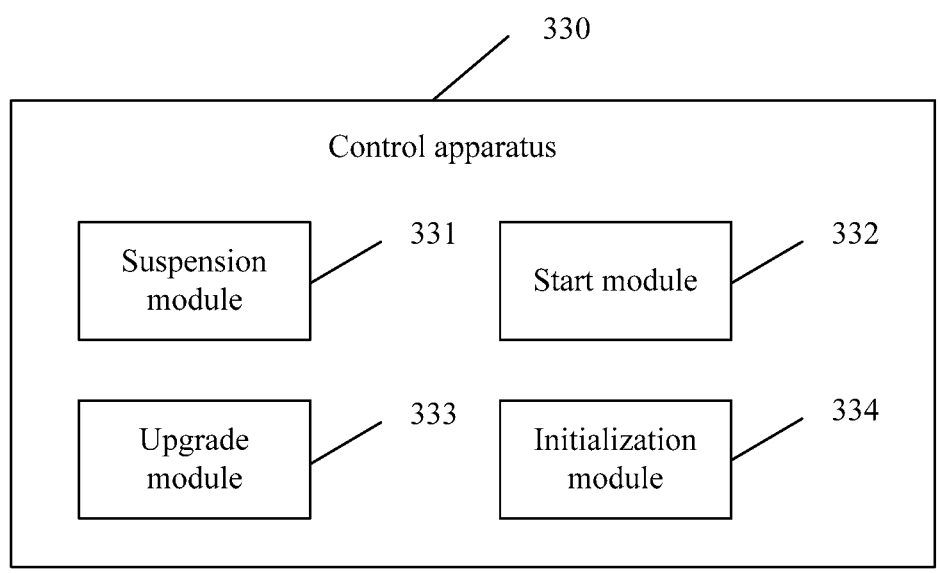
FIG. 10 is a simplified schematic diagram of an apparatus for implementing secure operating system switching according to an embodiment of the present invention.

As shown in FIG. 10, an embodiment further provides an apparatus 330 for controlling a secure processor 31 in a secure element 23 to implement secure operating system switching. The apparatus 330 includes a suspension module 331 and a start module 332, and may further include an upgrade module 333 and an initialization module 334. The suspension module 331 is configured to drive the secure processor 31 to perform a switching trigger process in FIG. 7, that is, S704 to S708, so that running secure operating system software is transferred from an internal random access memory 32 to an external volatile memory 41. For a specific operation of the suspension module 331, refer to descriptions in other embodiments in the above. The start module 332 is configured to drive the secure processor 31 to perform S802 to S806 in FIG. 8, to switch the secure processor 31 to run another piece of secure operating system software. For a specific operation of the start module 332, refer to descriptions in other embodiments in the above. The upgrade module 333 is configured to drive the secure processor 31 to perform S902 to S906 shown in FIG. 9, to implement an upgrade operation. The initialization module 334 is configured to perform S801 in FIG. 8, that is, an initialization operation of the secure element 23 before a new system is started. Functions of the modules are not described again in this embodiment. A person skilled in the art may refer to descriptions in the foregoing embodiments.

Optionally, the apparatus 330 shown in FIG. 10 may be a software apparatus and implemented by using multiple types of software instruction code. Any one or more modules of the apparatus 330 may be included in an on-chip instruction in an internal read-only memory 33, to implement a related function. Further, the apparatus 330 may further include two or more pieces of secure operating system software described in the foregoing embodiments. Further, the apparatus 330 may further include general-purpose operating system software and trusted execution environment software that are described in the foregoing embodiments, and may further selectively include common application software and secure application software. This embodiment sets no limitation thereto. Specifically, the suspension module 331 may be a part of the on-chip instruction or another program bound to the secure operating system software. As mentioned in the foregoing embodiments, the switching trigger process may be performed by the secure processor 31 when driven by a first switching program in the on-chip instruction or a second switching program bound to the secure operating system software.

For the secure processor 31, related operations such as secure switching, a secure upgrade, and initialization in this embodiment may be driven by the on-chip instruction in the read-only memory 33. The secure processor 31 may directly read and run the on-chip instruction to perform a corresponding operation. The secure processor 31 may run the on-chip instruction without using the internal random access memory 32. In addition, when performing a regular secure operating system software function and a regular secure application software function, the secure processor 31 needs to use the internal random access memory 32, that is, load data of the related software into the internal random access memory 32.

It may be understood that a typical application scenario of a mobile terminal 20 mentioned in the embodiments of the present invention may be a mobile phone, for example, various smartphones. Each component, for example, at least one processor or the secure element 23, inside a system on chip 21, may include multiple transistors or logical gate circuits, and may work when driven by necessary software. Alternatively, some devices may selectively work without software and may be, for example, a hardware-only accelerator.

It should be noted that mobile payment in the embodiments of the present invention is a definition in a broad sense, and not only includes commercial and financial mobile payment services, but also includes other types of payment services such as public transportation, an identity card, and a social security card. That is, in the mobile payment, a mobile terminal may be connected to a communications peer end, to eventually implement exchange of payment information with a server, and implement data transaction, data exchange, or data settlement related to one or more accounts in the mobile terminal. A unit of the data transaction, data redemption, or data settlement may include a currency, and may also be another unit such as a virtual currency, various bonus points, or a credit limit that can be used to implement payment, exchange, or transaction settlement. This embodiment sets no limitation thereto. The account includes but is not limited to a personal account, a group account, or an organization account. Compared with a payment behavior implemented only on a fixed terminal, the mobile payment is implemented more flexibly, and the mobile payment is executed by the mobile terminal 20 shown in FIG. 2. Therefore, a requirement of making a payment at any time any place can be better satisfied.

It should be noted that the system on chip 21 mentioned in the embodiments of the present invention is applied to the mobile terminal 20. However, actually, the system on chip 21 may also be applied to another processing device having no mobile communication function, for example, a handheld device having no mobile communication capability. Therefore, functions of some devices or units in the system on chip 21 mentioned in the embodiments of the present invention are not mandatory. For example, at least one processor in the system on chip 21 may be omitted. For example, one or more of a graphics processing unit 212, a communication processor 213, a voice signal processor 214, a system peripheral interface 215, an image signal processor 217, or the like may be selectively omitted. A system power management unit 216 in the system on chip 21 may also be omitted or replaced with a power control circuit with a simpler function and design. Therefore, a form of a related processing device including the system on chip 21 is also not limited.

The system on chip 21 mentioned in the foregoing embodiments that supports switching between multiple pieces of secure operating system software can implement flexible and dynamic inter-system switching. Because of a limited capacity of the internal random access memory 32, the secure processor 31 usually runs only one piece of secure operating system software. However, the embodiments impose no limitation on a quantity of secure operating system software that can be simultaneously run by the secure processor 31. For one or more pieces of secure operating system software that are not running, data thereof may be stored in the external volatile memory 41 after undergoing secure processing. The volatile memory 41 has a high access speed; therefore, the data can be conveniently reloaded into the secure element 23 subsequently, implementing dynamic and flexible switching.

Further, in the foregoing embodiments, secure data of the secure operating system software that is not running may also be stored in an external non-volatile memory 42 instead of the volatile memory 41, to implement an effect similar to that in the foregoing embodiments. However, in this case, a speed of reloading the related secure data into the secure element 23 is reduced.

The foregoing are merely some embodiments of the present invention. A person skilled in the art may make, according to the disclosed application document, various modifications and variations to the present invention without departing from the scope of the present invention. For example, specific shapes or structures of components in the accompanying drawings of the embodiments of the present invention may be adjusted according to an actual application scenario.

The invention claimed is:

1. A system on chip, wherein the system on chip is integrated in a first semiconductor chip and comprises a secure element and at least one central processing unit that is coupled to the secure element, wherein security isolation exists between the secure element and the at least one central processing unit, wherein:
the at least one central processing unit is configured to communicate with the secure element;
the secure element comprises a secure processor and a first memory that is coupled to the secure processor;
the secure processor is configured to run first secure operating system software;
the first memory is configured to store first running data of the first secure operating system software when the secure processor runs the first secure operating system software;
the secure processor is further configured to:
when determining that the secure processor needs to switch to second secure operating system software:
suspend running of the first secure operating system software;
perform at least one of encryption or message authentication code (MAC) computation on the first running data to obtain first secure data;
store the first secure data in a first dedicated area that is in a second memory outside the system on chip and that is corresponding to the first secure operating system software; and
start the second secure operating system software; and
the first memory is further configured to store second running data of the second secure operating system software when the secure processor runs the second secure operating system software.

2. The system on chip according to claim 1, wherein running of the second secure operating system software has been suspended by secure operating system switching; and when starting the second secure operating system software, the secure processor is further configured to:
obtain second secure data from a second dedicated area that is in the second memory and that is corresponding to the second secure operating system software;
perform at least one of decryption or MAC check computation on the second secure data to obtain the second running data; and
run the second running data to re-run the second secure operating system software, wherein the first dedicated area and the second dedicated area are different areas in the second memory.

3. The system on chip according to claim 2, wherein a key based on a first random number is used to perform the encryption on the first running data, a key based on a second random number is used to perform the decryption on the second secure data, and the first random number is different from the second random number.

4. The system on chip according to claim 1, wherein the secure element further comprises a MAC computation engine, and the secure processor is further configured to drive the MAC computation engine to perform the MAC computation on the first running data and to perform the MAC check computation on the second secure data.

5. The system on chip according to claim 1, wherein a first check value generated from the MAC computation and a second check value used for the MAC check computation are stored in a third memory outside the system on chip.

6. The system on chip according to claim 1, wherein running of the second secure operating system software has not been suspended by secure operating system switching; and
before starting the second secure operating system software, the secure processor is further configured to obtain the second secure operating system software from a third memory outside the system on chip.

7. The system on chip according to claim 6, wherein the secure processor is further configured to:
receive upgrade software from the at least one central processing unit; and
use the upgrade software to upgrade any secure operating system software stored in the third memory.

8. The system on chip according to claim 1, wherein the secure element further comprises a fourth memory, the fourth memory configured to store an on-chip instruction.

9. The system on chip according to claim 8, wherein the on-chip instruction comprises a boot program instruction required in initialization of the secure processor; and
before starting the second secure operating system software, the secure processor is further configured to:
obtain the boot program instruction from the fourth memory; and
execute the boot program instruction to implement initialization.

10. The system on chip according to claim 9, wherein after the secure processor stores the first secure data in the first dedicated area, the secure processor is further configured to trigger reset of the secure element.

11. The system on chip according to claim 8, wherein the on-chip instruction comprises a first switching program; and the secure processor is configured to:
execute the first switching program to suspend running of the first secure operating system software;
perform the at least one of encryption or MAC computation on the first running data to obtain the first secure data; and
store the first secure data in the first dedicated area.

12. The system on chip according to claim 8, wherein the secure processor is configured to:
execute a second switching program to suspend running of the first secure operating system software;
perform the at least one of encryption or message authentication code computation on the first running data to obtain the first secure data; and
store the first secure data in the first dedicated area, wherein the second switching program and the first secure operating system software are integrated in one software package.

13. The system on chip according to claim 8, wherein the on-chip instruction comprises a startup program, and the secure processor is configured to execute the startup program to start the second secure operating system software.

14. The system on chip according to claim 13, wherein when starting the second secure operating system software, the secure processor is configured to: execute the startup program to obtain, from a third memory outside the system on chip, an interrupt identifier of the second secure operating system software; and determine, by identifying the interrupt identifier, that running of the second secure operating system software has been or has not been suspended by secure operating system switching.

15. The system on chip according to claim 1, wherein the secure element further comprises a key manager; and
the secure processor is further configured to:
drive the key manager to generate, based on a system root key, a first system key used by the first secure operating system software for secure encryption and decryption; and
drive the key manager to generate, based on the system root key, a second system key used by the second secure operating system software for secure encryption and decryption, wherein the first system key is different from the second system key.

16. The system on chip according to claim 1, wherein the secure processor is further configured to determine, under control of the at least one central processing unit, that the secure processor needs to switch to the second secure operating system software.

17. The system on chip according to claim 16, wherein the system on chip further comprises an input interface, configured to receive a trigger message;
the at least one central processing unit is configured to:
when driven by general-purpose operating system software:
receive the trigger message from the input interface and generate a trigger instruction; and
transmit the trigger instruction to the secure processor in a trusted execution environment formed by trusted execution environment software; and
the secure processor is further configured to determine, after being triggered by the trigger instruction, that the secure processor needs to switch to the second secure operating system software.

18. The system on chip according to claim 1, wherein based on the security isolation, the at least one central processing unit is not capable of directly accessing the first memory or at least one register in the secure element.

19. The system on chip according to claim 18, wherein the system on chip further comprises a dedicated transmission channel, the dedicated transmission channel coupled between the secure element and the at least one central processing unit, and configured to implement communication between the at least one central processing unit and the secure processor on condition of the security isolation.

20. A method for controlling a secure processor in a secure element to implement secure operating system switching, comprising:
when determining that the secure processor needs to be controlled to switch from running first secure operating system software to running second secure operating system software:
suspending running of the first secure operating system software;
performing at least one of encryption or message authentication code (MAC) computation on first running data of the first secure operating system software to obtain first secure data; and
storing the first secure data in a first dedicated area that is in a second memory and that is corresponding to the first secure operating system software; and
starting the second secure operating system software, wherein
a first memory in the secure element stores the first running data when the secure processor runs the first secure operating system software, and stores second running data of the second secure operating system software when the secure processor runs the second secure operating system software; and wherein the secure element and at least one central processing unit are located in a system on chip, wherein the system on chip is integrated in a first semiconductor chip, the second memory is located outside the system on chip, and security isolation exists between the secure element and the at least one central processing unit, and wherein the at least one central processing unit is configured to communicate with the secure element.

\* \* \* \* \*